(12) United States Patent
Curry et al.

(10) Patent No.: US 6,966,967 B2
(45) Date of Patent: Nov. 22, 2005

(54) VARIABLE SPEED PUMP CONTROL

(75) Inventors: Mark William Curry, Morgan Hill, CA (US); Daniel Paul Greenbank, San Jose, CA (US); Danny Cam Toan Lu, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 142 days.

(21) Appl. No.: 10/400,174

(22) Filed: Mar. 26, 2003

(65) Prior Publication Data

US 2004/0013531 A1    Jan. 22, 2004

Related U.S. Application Data

(63) Continuation-in-part of application No. 10/154,410, filed on May 22, 2002, now Pat. No. 6,739,840.

(51) Int. Cl.[7] ............... H01L 21/306; C23C 16/00; C16C 16/52; F04B 49/06
(52) U.S. Cl. ............... 156/345.26; 156/345.24; 156/345.29; 118/715; 417/44.1; 417/42; 417/53; 417/423.4; 700/121; 700/275; 700/282
(58) Field of Search ............... 417/42, 44.1–44.4, 417/326, 53, 423.4; 415/90, 118; 118/715; 156/345.29, 345.24, 345.26; 700/121, 275, 700/282, 301

(56) References Cited

U.S. PATENT DOCUMENTS

| | | | |
|---|---|---|---|
| 4,699,570 A * | 10/1987 | Bohn | 417/6 |
| 4,700,315 A | 10/1987 | Blackburn et al. | 364/477 |
| 4,728,869 A | 3/1988 | Johnson et al. | 318/335 |
| 5,165,864 A * | 11/1992 | Burger et al. | 417/244 |
| 5,575,853 A * | 11/1996 | Arami et al. | 118/708 |
| 5,616,208 A | 4/1997 | Lee | 156/345 |
| 5,626,679 A | 5/1997 | Shimizu et al. | 118/723 |
| 5,746,581 A * | 5/1998 | Okumura et al. | 417/2 |
| 5,785,796 A | 7/1998 | Lee | 156/345 |
| 5,888,579 A | 3/1999 | Lun | 427/8 |
| 5,971,711 A * | 10/1999 | Noji et al. | 417/2 |
| 6,022,195 A | 2/2000 | Gaudet et al. | 417/27 |
| 6,079,426 A * | 6/2000 | Subrahmanyam et al. | 134/1.1 |
| 6,088,508 A | 7/2000 | Ishibashi et al. | 388/800 |
| 6,200,107 B1 | 3/2001 | Brewster | 417/251 |
| 6,416,290 B1 * | 7/2002 | Yamauchi | 417/32 |
| 6,419,455 B1 | 7/2002 | Rousseau et al. | 417/36 |
| 6,474,949 B1 | 11/2002 | Arai et al. | 417/2 |

(Continued)

FOREIGN PATENT DOCUMENTS

EP    0 900 940 A2    3/1999    ........... F04D 27/02

(Continued)

OTHER PUBLICATIONS

International Search Report for International Application No. PCT/US 03/15030, dated Aug. 5, 2003.

Primary Examiner—Jeffrie R. Lund
(74) Attorney, Agent, or Firm—Moser Patterson & Sheridan

(57) ABSTRACT

A method and apparatus for monitoring operating characteristics and/or control signals of a system comprising a variable speed vacuum pump. Operating characteristics and/or control signals of the system may be monitored, and the pumping speed of the variable speed vacuum pump may be altered responsive to the monitored operating characteristics and/or control signals.

35 Claims, 13 Drawing Sheets

U.S. PATENT DOCUMENTS

| | | | |
|---|---|---|---|
| 6,592,340 B1 * | 7/2003 | Horo et al. | 417/293 |
| 6,739,840 B2 * | 5/2004 | Curry et al. | 417/44.1 |
| 2003/0219342 A1 * | 11/2003 | Curry et al. | 417/44.1 |
| 2004/0013531 A1 * | 1/2004 | Curry et al. | 417/42 |

FOREIGN PATENT DOCUMENTS

| | | | |
|---|---|---|---|
| EP | 1 043 645 A1 | 10/2000 | G05D 16/20 |
| EP | 1 081 380 A1 | 3/2001 | F04B 49/06 |
| WO | WO 01/96972 A2 | 12/2001 | G05D 16/20 |

* cited by examiner

VARIABLE SPEED PUMP CONTROL

CROSS-REFERENCE TO RELATED APPLICATIONS

This application is a continuation-in-part of U.S. patent application Ser. No. 10/154,410, filed May 22, 2002 now U.S. Pat. No. 6,739,840, which is herein incorporated by reference.

BACKGROUND OF THE INVENTION

1. Field of the Invention

The present invention generally relates to a method and apparatus for controlling a vacuum pump system.

2. Description of the Related Art

Semiconductor substrate processing is generally performed in process chambers having sub-atmospheric pressures. Vacuum pump systems are commonly utilized to achieve and maintain sub-atmospheric pressures within the process chambers. The vacuum pump systems are typically remotely located in a "grey area" or a "sub-fab" outside the clean room to prevent adverse affects on substrate processing.

Vacuum pump systems serving a typical process chamber generally have a pumping capacity in the range of 1600 l/min up to 25,000 l/min in order to satisfy the needs of typical substrate processing operations. Vacuum pump systems of this capacity generally consume up to about 6 kilowatts per hour of electricity. Further, vacuum pump systems are typically operated at a constant speed during system operation, while chamber pressure is controlled by gas flow, throttle valve and isolation valve actuation. Accordingly, vacuum pump systems are a significant source of power consumption in semiconductor processing systems, as well as other types of systems.

As a result, new approaches to reducing the power consumption of vacuum pump systems are constantly being explored. Reducing power consumption is desirable both for reducing the energy associated with maintaining sub-atmospheric pressures and for reducing the heat generated and subsequent cooling requirements of the vacuum system, the clean room and the facility. Additionally, conservation of energy is desirable for social, economic and environmental benefits.

One possible approach to conserving power is through the use of variable speed vacuum pumps. Typically, variable speed vacuum pump systems include a motor driver that operates to maintain one or more selected motor speed setpoint(s) proportional to a desired pumping speed. The motor speed setpoint(s) is determined according to the desired processing conditions. During operation, the pumping speed may be changed by altering the selected motor speed setpoint(s). By controlling the speed of the pump it is possible to slow the motor speed when a higher speed is not needed.

Integrating a variable speed pump system onto an existing semiconductor processing system may require substantial changes to the system control software. Making software changes to existing systems is both expensive and time-consuming, and may require tracking a number of different software versions across a variety of semiconductor processing system platforms. Therefore, there is a need for a vacuum pump system that reduces power consumption and may be integrated onto a wide variety of semiconductor processing systems with minimal changes to processing system control software.

SUMMARY OF THE INVENTION

The present invention generally provides methods and apparatus for monitoring operating characteristics and/or control signals of a semiconductor processing system comprising a variable speed vacuum pump, and for controlling the pumping speed of the variable speed vacuum pump responsive to the monitored operating characteristics and/or control signals.

One embodiment of the invention provides a pump speed controller for controlling the pumping speed of a variable speed vacuum pump coupled to a semiconductor processing system. The pump speed controller comprises a processor and a sensor interface coupled to the processor for receiving sensor input from at least one sensor. Each of the at least one sensors is configured to monitor one or more control signals within the semiconductor processing system. The pump speed controller further comprises instructions for configuring the processor to generate a pump speed control signal in response to the monitored control signals, and a pump interface for transmitting the pump speed control signal to the variable speed vacuum pump.

Another embodiment of the invention provides a pump speed controller for controlling the pumping speed of a variable speed vacuum pump coupled to a semiconductor processing system. The pump speed controller comprises a sensor interface for receiving sensor input from at least one sensor, wherein the at least one sensor monitors one or more control signals within the semiconductor processing system. The pump speed controller further comprises a processor coupled to the sensor interface, wherein the processor receives at least one sensor signal from the sensor interface, and wherein the processor uses one or more algorithms to determine a pump speed responsive to the at least one sensor signal. A pump interface is coupled to the processor for transmitting a pump speed control signal generated by the processor to the variable speed vacuum pump, wherein the pump speed control signal corresponds to the determined pump speed.

Yet another embodiment of the invention provides a semiconductor processing system comprising a vacuum chamber and a variable speed vacuum pump coupled to the vacuum chamber. A system controller is coupled to the vacuum chamber, and the system controller transmits control signals to apparatus servicing the vacuum chamber. A pump speed controller is coupled to the variable speed vacuum pump. The pump speed controller monitors the control signals transmitted by the system controller and determines a pump speed responsive to the monitored control signals.

Yet another embodiment of the invention provides a method of operating a variable speed vacuum pump coupled to a semiconductor processing system. The method comprises monitoring a first control signal of the semiconductor processing system and determining a pump speed in response to the monitored first control signal. A second control signal is transmitted to the variable speed vacuum pump, wherein the second control signal corresponds to the pump speed. A speed of the variable speed vacuum pump is changed to operate at the pump speed.

Yet another embodiment of the invention provides a computer readable medium containing a program which, when executed, performs an operation for controlling a variable speed pump in a semiconductor processing system comprising a vacuum chamber in fluid communication with the variable speed pump. The operation comprises monitoring a first control signal of the semiconductor processing system and determining a pump speed in response to the monitored first control signal. A second control signal is transmitted to the variable speed vacuum pump, wherein the second control signal corresponds to the pump speed. A speed of the variable speed vacuum pump is changed to operate at the pump speed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1:
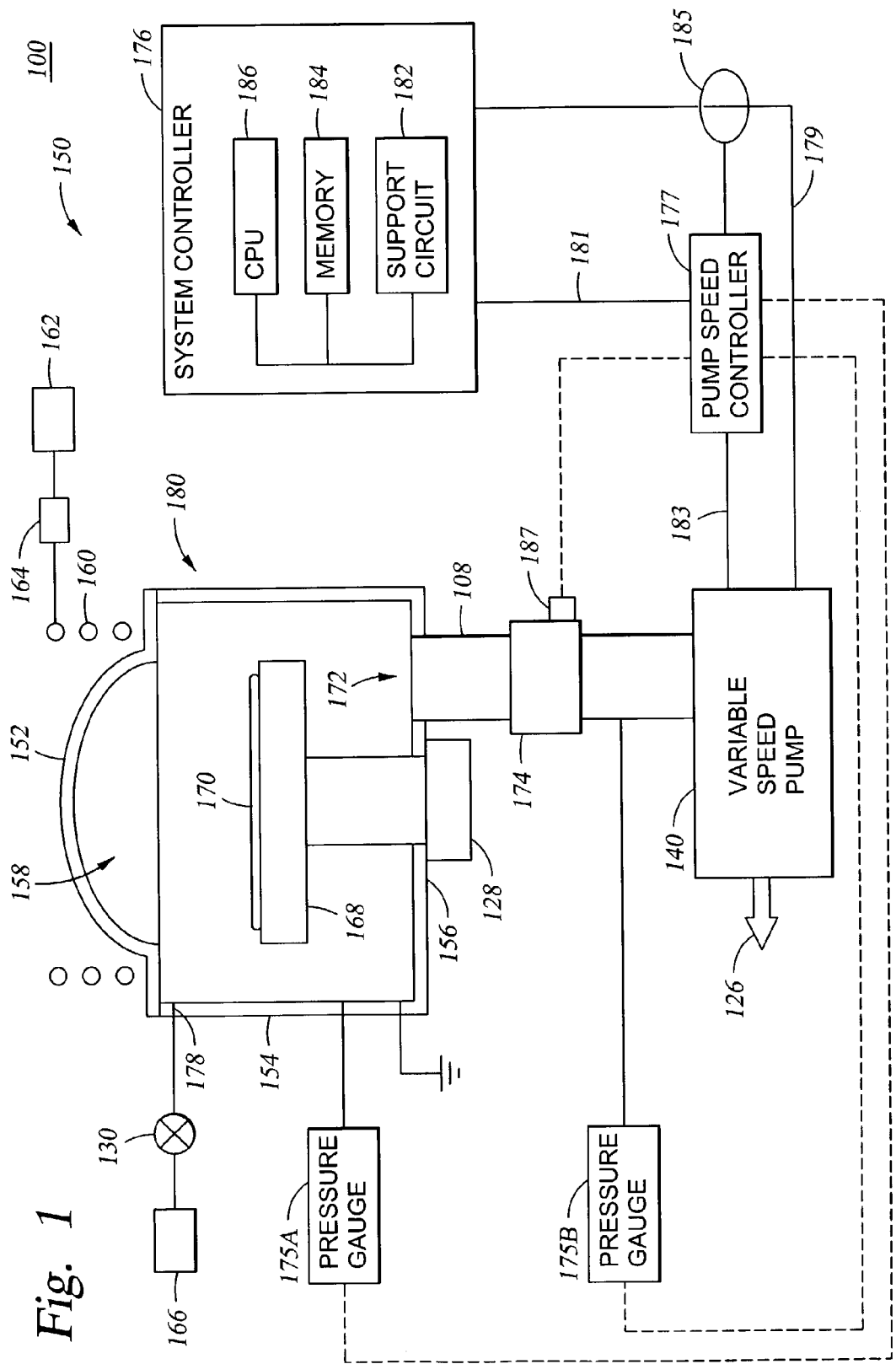
FIG. 1 depicts a substrate processing chamber coupled to one embodiment of a vacuum system.

In general, the present invention relates to monitoring operating characteristics and/or control signals of a semiconductor processing system comprising a variable speed vacuum pump, and controlling the pumping speed of the variable speed vacuum pump responsive to the monitored operating characteristics and/or control signals. In one embodiment, a characteristic of an electrical signal delivered to the variable speed vacuum pump is monitored. One such characteristic is, for example, current. When the monitored electrical signal exhibits a behavior indicative of a change in the gas load on the variable speed vacuum pump system, the speed of the variable speed vacuum pump is changed. In some embodiments, other devices (e.g., pressure gauges, position sensors, etc.) may provide additional information in tandem with the monitored electrical signal that is useful in operating the variable speed vacuum pump. In other embodiments, control signals of a system may be monitored to control the speed of the variable speed vacuum pump. For example, electrical, pneumatic, hydraulic, fiber-optic, and other types of control signals commonly used to control the operation of mechanical components (e.g., valves, actuators, motors) within a system may be monitored. In yet another embodiment, one or more algorithms may be generated according to attributes and desired operating characteristics of the system. The algorithms may be used in conjunction with monitored control signals to control the speed of a variable speed vacuum pump.

One embodiment of the invention may be implemented as one or more computer program(s) for use with a computerized device. The computer program(s) define functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention may be part of an operating system or a specific application, component, program, module, object, or sequence of instructions. The computer program(s) of the present invention typically comprises a multitude of instructions that may be translated by a computer into a machine-readable format and hence executable instructions. Also, computer programs may be comprised of variables and data structures that either reside locally to the program or are found in memory or on storage devices. In addition, various computer programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a schematic of one embodiment of a semiconductor processing system 100 comprising a vacuum chamber 150. The vacuum chamber 150 generally may be any type of chamber utilized for semiconductor processing and which is at least temporarily under vacuum conditions. For purposes of illustration, the vacuum chamber 150 will be described as a processing chamber and, in particular, as an etch chamber, i.e., a chamber wherein an etch process is performed upon a substrate. However, other chambers such as physical vapor deposition chambers, chemical vapor deposition chambers, ion implantation chambers, transfer chambers, pre-clean chambers, de-gas chambers, load lock chambers, orientation chambers and the like may use aspects of the invention to advantage. Furthermore, aspects of the invention may be used to advantage with a cluster tool in which one or more chambers are individually serviced by different pumps or where a plurality of chambers are collectively serviced by an integrated pumping system.

Examples of some illustrative chambers are described in U.S. Pat. No. 5,583,737, issued Dec. 10, 1996; U.S. Pat. No. 6,167,834, issued Jan. 2, 2001; U.S. Pat. No. 5,824,197, issued Oct. 20, 1998; and U.S. Pat. No. 6,254,328, issued Jul. 3, 2001, all of which are incorporated herein by reference in their entireties.

In the embodiment depicted in FIG. 1, the vacuum chamber 150 is an etch chamber and generally includes a chamber body 180 having a bottom 156, walls 154 and a lid 152. The walls 154 generally have a sealable aperture disposed therethrough to facilitate entry and egress of a substrate 170 from the vacuum chamber 150. The walls 154 may be coupled to electrical ground and typically include one or more inlet ports 178 disposed therein. The inlet ports 178 may be used for selectively flowing gas(es) into the vacuum chamber 150 from a gas source 166.

The lid 152 may be supported by the walls 154. In one embodiment, the lid 152 may be a quartz dome circumscribed by a plurality of coils 160. The coils 160 may be coupled to a power source 162 through a matching circuit 164 and supplies RF power to the coils 160. The RF power may be used to ignite and/or maintain a plasma formed from the process gases within the chamber body 180.

The substrate 170 may be supported within the chamber by a pedestal 168. The pedestal 168 may regulate the temperature of substrate 170 by, for example, the application of backside gas, resistive heating, circulation of heat transfer fluid therein or by other methods.

An exhaust port 172 may be formed in the bottom 156 of the chamber body 180. A vacuum pump 140 may be coupled to the vacuum chamber 150 by a foreline 108 disposed between the exhaust port 172 and the vacuum pump 140. In one embodiment, a valve assembly 174 may be disposed in the foreline 108 to selectively control fluid communication between the vacuum pump 140 and the vacuum chamber 150. Illustratively, the valve assembly 174 may include one or more valves that may be individually operated. In a particular embodiment, the valve assembly 174 may include a throttle valve. However, any appropriate valve may be used to advantage including, for example, a gate valve.

Pressure may be controlled within the chamber 150, at least in part, by articulating the valve(s) of the valve assembly 174. Pressure within the chamber may be determined from one or more pressure gauges. Illustratively, a pressure gauge 175A is shown in communication with the processing cavity defined by the chamber body 180. Alternatively or additionally, a pressure gauge 175B may be coupled to the foreline 108, downstream from the valve assembly 174 and up stream from the vacuum pump 140.

The vacuum pump 140 may comprise any suitable type of variable speed vacuum pump. Examples of vacuum pumps typically utilized for evacuating processing chambers are roots pumps and hook and claw pumps. Other vacuum pumps, such as turbo molecular pumps, rotary vane pumps, screw type pumps, tongue and groove pumps and positive displacement pumps among others may also be utilized. The particular type of variable speed vacuum pump used will depend on the processing requirements for the processing to be performed in the chamber 150. By way of example, one particular pump which may be used to advantage is the iPUP® (integrated Point of Use Pump) available from Applied Material, Inc. of Santa Clara, Calif. Further, processing systems commonly use staged or cooperative pumping arrangements. For example, it may be desirable to have a first pump capable of pumping the chamber 150 to a first pressure within a first pressure regime and a second pump capable of pumping the chamber 150 to a second pressure within a second pressure regime, where the second pressure is lower than the first pressure. For example, the first pressure regime may be a very low-pressure regime and the second pressure regime may be an ultra-low-pressure regime. Accordingly, it is contemplated that the vacuum pump 140 may in fact represent two or more vacuum pumps, or vacuum pump 140 may be connected to at least one other vacuum pump.

In the illustrated embodiment, the application of electrical power to the vacuum pump 140 may be controlled by a system controller 176, which is coupled to the vacuum pump 140 by a power supply line 179. While the power supply line 179 may be any suitable power transmission medium, in a particular embodiment, the power supply line 179 is a three-phase power line adapted to deliver a 208V alternating current (AC) signal.

In addition to controlling a power signal to the vacuum pump 140, the system controller 176 may be more generally configured to control at least some of the other components of the vacuum chamber 150. In general, the system controller 176 may be any device capable of controlling the operation(s) of the chamber 150. Although only one system controller 176 is shown, a number of system controllers may be provided to handle varying tasks. In one embodiment, the system controller 176 generally comprises a central processing unit (CPU) 186, support circuits 182 and memory 184, each of which may be coupled to the vacuum chamber 150 and semiconductor processing system 100. The CPU 186 may be one of any form of computer processor that can be used in an industrial setting for controlling various chambers and subprocessors. The memory 184 is coupled to the CPU 186, whereby the CPU 186 may be read from and/or write to the memory 184. The memory 184, or computer-readable medium, may be one or more memory devices such as random access memory (RAM), read only memory (ROM), erasable programmable memory (EPROM), a floppy disk, a hard disk, or any other form of digital storage, local or remote. The support circuits 182 may be coupled to the CPU 186 for supporting the processor in a conventional manner. The support circuits 182 may include cache, power supplies, clock circuits, input/output circuitry, subsystems, and the like.

The speed of the vacuum pump 140 is generally controlled by a pump speed controller 177. Illustratively, the pump speed controller 177 is disposed in-line between the vacuum pump 140 and the system controller 176. In the illustrated in-line embodiment, the pump speed controller 177 is connected to the system controller 176 by a first transmission medium 181, and the pump speed controller 177 is connected to the vacuum pump 140 by a second transmission medium 183. In one embodiment, the transmission mediums 181,183 are cables or other physical connectors. However, in other embodiments, the pump speed controller 177, the system controller 176 and the vacuum pump 140 may be configured for wireless transmissions (e.g., bluetooth), in which case the transmission mediums 181, 183 may be air (or some other fluid environment).

Even though the system controller 176 is shown physically connected to the pump speed controller 177 via the transmission medium 181, it should be noted that, in one embodiment, the signals issued by the system controller 176 may pass through the pump speed controller 177, unread and unaltered. That is, cooperative operation of the system controller 176 and the pump speed controller 177 is not required. Accordingly, in another embodiment, the system controller 176 need not be physically coupled to the pump speed controller 177. Instead, the transmission medium 181 may simply by-pass the pump speed controller 177 and be directly connected to the vacuum pump 140. In still another embodiment, some signals may be provided from the system controller 176 to the pump speed controller 177 while others are not. For example, it is contemplated that in one embodiment system controller 176 may issue an ON/OFF signal to the pump speed controller 177 to turn the pump speed control signals ON or OFF. In another embodiment, the system controller 176 may issue pump speed control signals to the pump speed controller 177, thereby causing the pump speed controller 177 to issue a pump speed control signal to the vacuum pump 140 when the pump speed controller 177 would otherwise not have done so.

In one embodiment, the speed control signals directed from the pump speed controller 177 to the vacuum pump system 140 may be responsive to a determination of an operating characteristic(s) being monitored by the pump speed controller 177. Illustrative operating characteristics include power, voltage, current, etc. In a particular embodiment, the pump speed controller 177 may receive signals from a current sensor 185 to determine the power consumption of the vacuum pump 140. In one embodiment, the current sensor may comprise a torroid sensor.

In addition to receiving signals from the current sensor 185, the pump speed controller 177 may receive signals from other devices, which signals may then be used in operating the vacuum pump 140. For example, in one embodiment the pump speed controller 177 is coupled to a valve position sensor 187. The valve position sensor 187 is configured to send a signal indicative of the position (e.g., open or closed) of the valve assembly 174. In another embodiment, the pump speed controller 177 is coupled to one or more of the pressure gauges 175A-B. Input from such devices to the pump speed controller 177 may be used to operate the vacuum pump 140 in a power efficient manner, as will be described in more detail below.

Particular embodiments of the vacuum pump 140 and the pump speed controller 177 will now be described with reference to FIG. 2 and FIG. 3, respectively.

Figure 2:
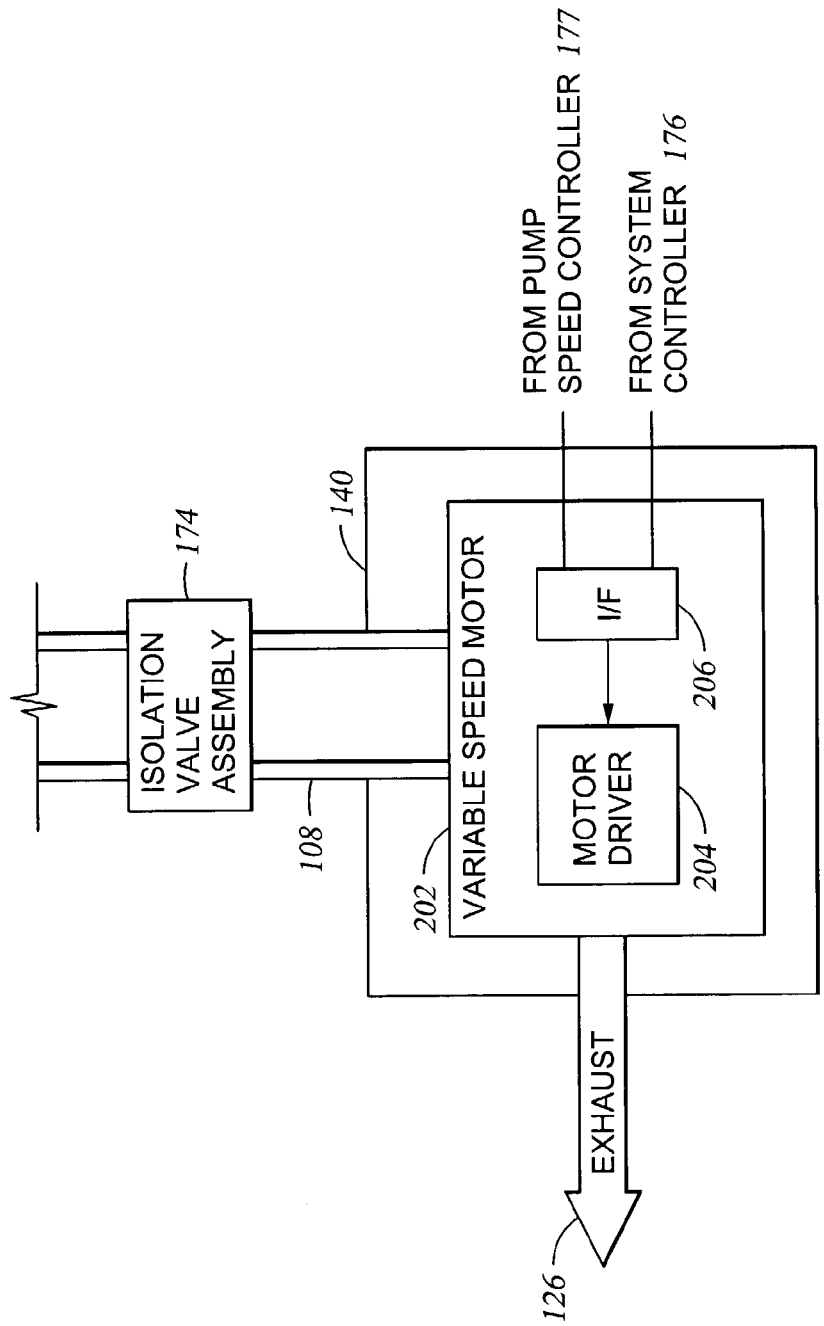
FIG. 2 depicts one embodiment of a variable speed pump.

Referring to FIG. 2, a particular embodiment of the vacuum pump 140 is shown. For simplicity, the vacuum pump 140 is shown comprising only a variable speed motor 202 and the exhaust 126. However, it is understood that the vacuum pump 140 may include any number of well-known components. The speed of the variable speed motor 202 is controlled by a motor driver 204. The motor driver takes as input an electrical power signal from the system controller 176 and control signals from the system controller 176 and/or the pump speed controller 177, via a pump interface 206. Generally, the speed of the motor 202, given in revolutions per minute (RPM) or hertz (Hz), is determined by a user-selected speed setpoint. In one embodiment, the user-selected speed setpoint may be input to (e.g., by a human operator) and stored in the motor driver 204. In operation, the motor driver 204 operates to maintain the user-selected speed setpoint, even during changes in the gas load on the motor 202. For example, an increasing gas load on the motor 202 may cause the motor driver 204 to increase the motor torque output in order to maintain the user-selected speed setpoint.

Figure 3:
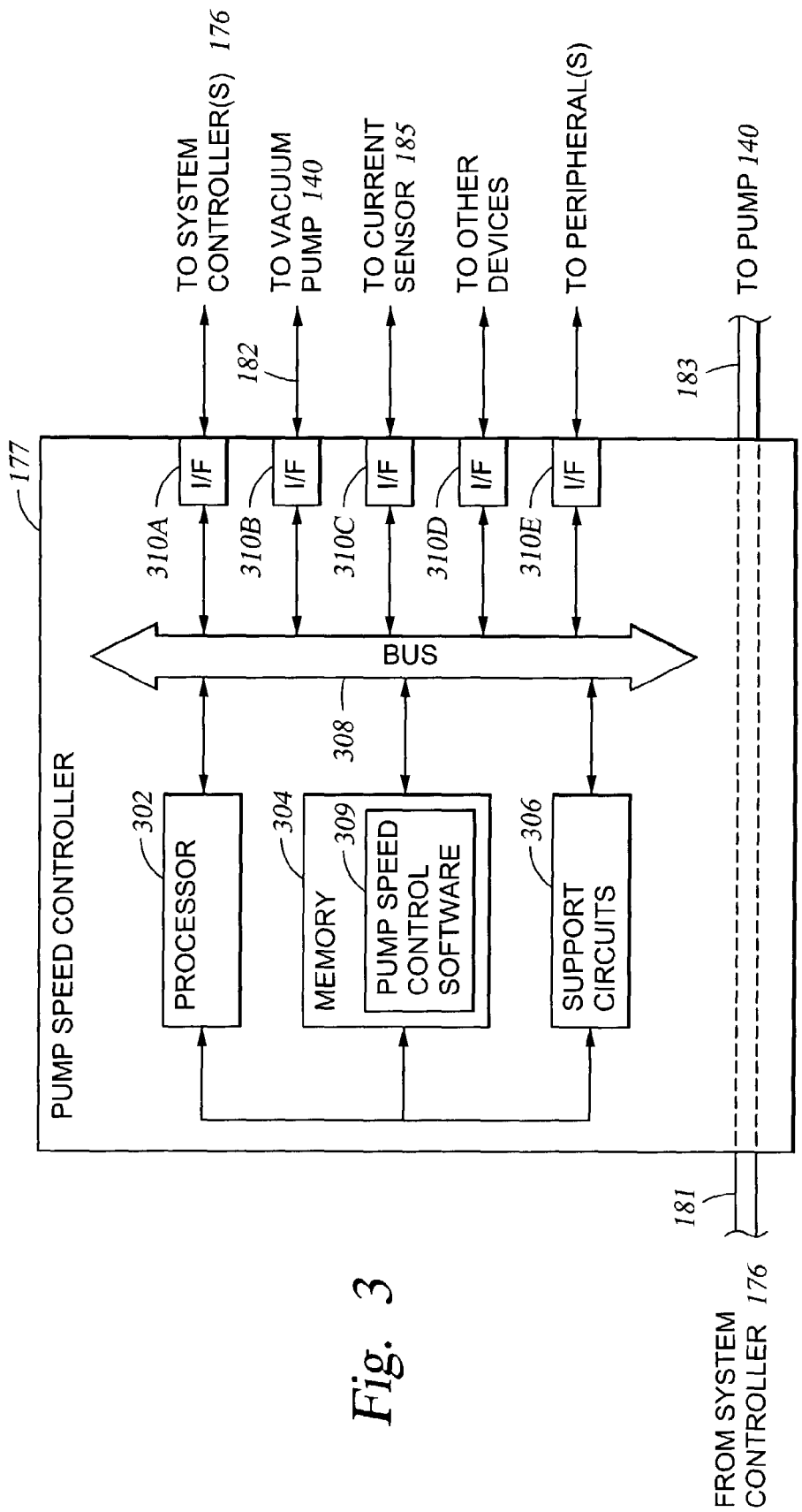
FIG. 3 depicts one embodiment of a pump speed controller.

Referring to FIG. 3, an embodiment of the pump speed controller 177 is shown. In one embodiment, the pump speed controller 177 generally comprises a central processing unit (CPU) 302, memory 304 and support circuits 306 each of which are coupled to one another by a bus 308. The CPU 302 may be one of any form of computer processor that can be used in an industrial setting for controlling the speed of the vacuum pump 140. The support circuits 306 are coupled to the CPU 302 for supporting the CPU 302 in a conventional manner. These circuits may include cache, power supplies, clock circuits, input/output circuitry, subsystems, and the like. The memory 304 is coupled to the CPU 302 by the bus 308, whereby the CPU 302 may be read from and/or write to the memory 304. The memory 304, or computer-readable medium, may be one or more memory devices such as random access memory (RAM), read only memory (ROM), erasable programmable memory (EPROM), a floppy disk, a hard disk, or any other form of digital storage, local or remote.

The memory 304 is shown containing pump speed control software 309. When executed, the pump speed control software 309 may configure the CPU 302 to monitor information related to one or more operating characteristics of semiconductor processing system 100. In one aspect, an operating characteristic may be a characteristic of vacuum pump 140 monitored by a sensor. The sensor may generate an output signal which, when processed, causes the CPU 302 (by execution of the pump speed control software 309) to issue instructions for operating the vacuum pump 140 in a specified manner. For example, the CPU may issue instructions to the vacuum pump 140 in the form of control signals for changing an operating speed of the vacuum pump 140.

Information may be input to and output from the pump speed controller 177 via one or more interfaces. Illustratively, five interfaces 310A–E are shown. A first interface 310A couples the pump speed controller 177 to the system controller 176. Information exchanged via the first interface 310A may include, for example, status information, ON/OFF signals and interlock signals. A second interface 310B couples the pump speed controller 177 to the vacuum pump 140 via the transmission medium 183. Information exchanged via the second interface 310B may include, for example, control signals for changing the operating speed of the vacuum pump 140. Third and fourth interfaces 310C–D provide sensor information to the pump speed controller 177. In particular, the third interface 310C may be connected to the current sensor 185 depicted in FIG. 1. The fourth interface 310D is representative of one or more interfaces that may, in some embodiments, be connected to other sensors. For example, one or both of the pressure gauges 175A–B and/or the pressure switch 187 may be connected to the pump speed controller 177 through fourth interface 310D. A fifth interface 310E is representative of one or more interfaces provided to facilitate connection to one or more peripheral components. For example, it may be desirable to connect the pump speed controller 177 to a laptop computer, personal digital assistant (PDA), wireless telephony device, etc. Connection of such a peripheral component may facilitate programming of the pump speed controller 177.

With regard to the first interface 310A, which couples the pump speed controller 177 to the system controller 176, it should be noted that embodiments without such an interface are contemplated. Instead, as was described above, the signals propagated from the system controller 176 via the transmission medium 181 (shown partly in hidden lines) may be coupled directly to the vacuum pump 140. However, the first interface 310A may facilitate selective control of the pump speed controller 177 and/or the vacuum pump 140 as was described above.

Figure 4:
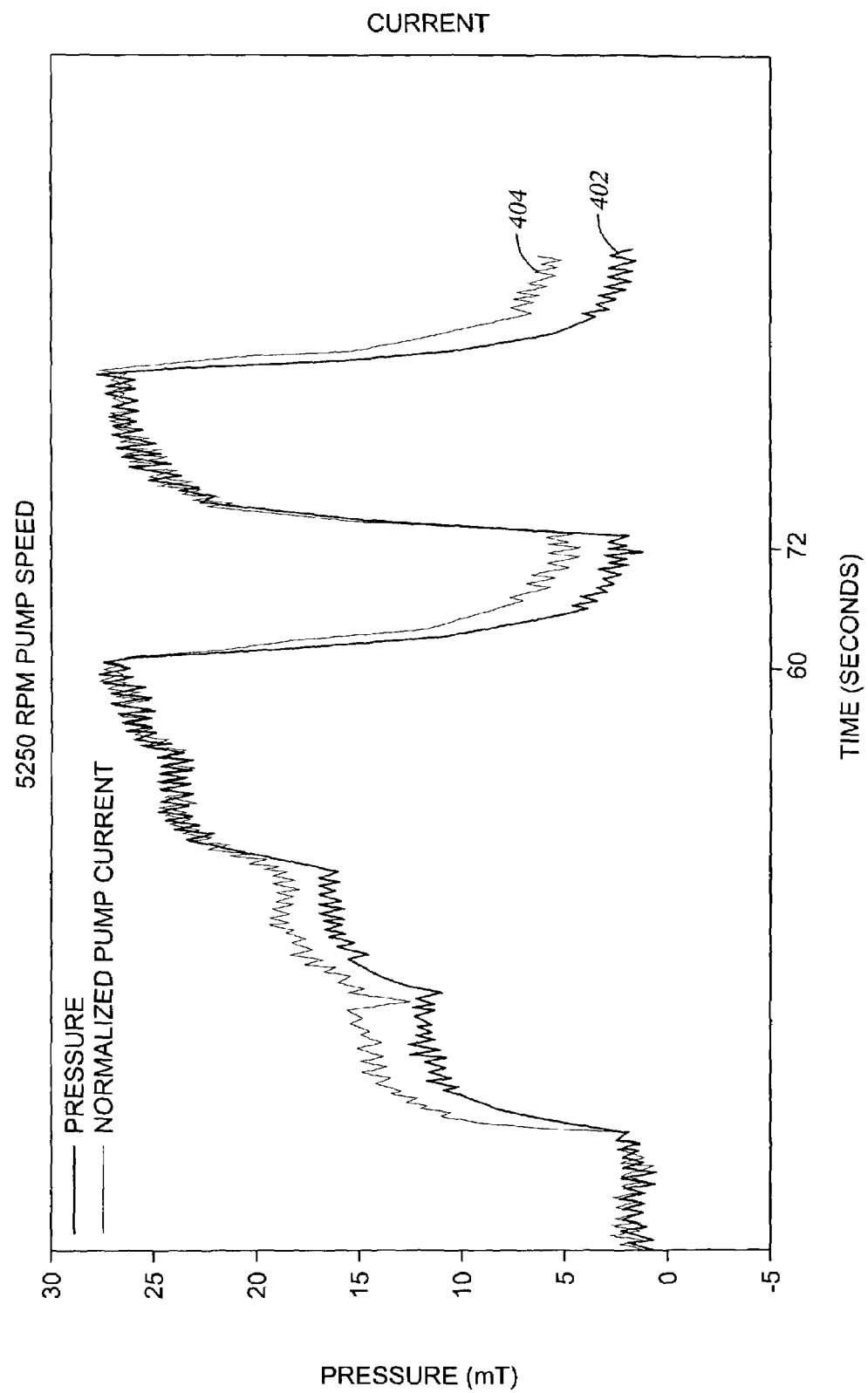
FIG. 4 depicts a graph indicating a relationship between power consumption and pressure of a vacuum system.

Some aspects of the present invention are premised upon a relationship between pressure in a chamber foreline 108 and the power consumption of the vacuum pump 140. This relationship is shown in the experimental data depicted in the graph of FIG. 4. In particular, the graph of FIG. 4 shows a pressure curve 402 and a corresponding pump current curve 404 with respect to time. The pressure curve 402 is representative of pressure measurements taken in a foreline connecting a load lock to a variable speed pump operating at 5250 RPM. Pump current measurements were taken by a current sensor monitoring one phase of a three-phase cable directing electrical power to vacuum pump 140. For purposes of facilitating understanding, the current curve 404 has been normalized to remove noise. As shown, the pressure curve 402 and the current curve 404 are closely correlated. That is, a change in the pressure results in a corresponding change in the current in the same direction. For example, when the pressure drops from about 26 mT at about 59 seconds to about 2 mT at about 72 seconds, the pump current curve 404 exhibits a corresponding decrease. Similarly, the pressure increase starting at about 72 seconds results in a corresponding pump current increase. Accordingly, it can be seen that a relatively lower gas load on a pump requires relatively less power to maintain a given pump speed while, conversely, a relatively higher gas load requires relatively more power in order to maintain the same pump speed.

From the data depicted in FIG. 4, it was determined that an operating characteristic, such as pump current, could be monitored to determine when a speed of a vacuum pump 140 may be changed to maintain or obtain a desired chamber pressure, alone or in combination with other chamber components. One embodiment for using an operating characteristic of a variable speed vacuum pump, (e.g., the vacuum pump 140) in this manner will now be described with respect to FIG. 5.

Figure 5:
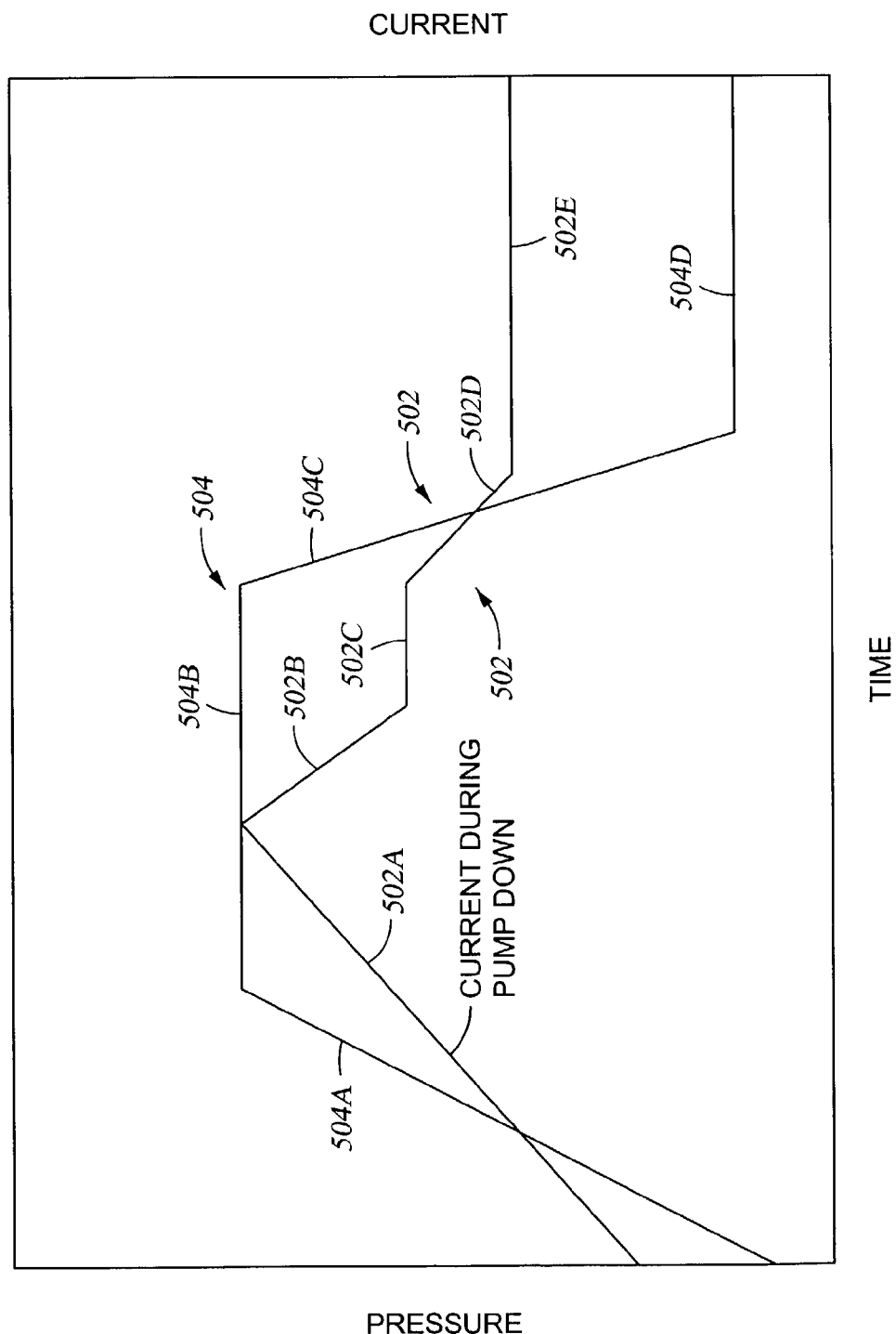
FIG. 5 depicts a graph of current and pump speed.

In general, FIG. 5 shows a pump current curve 502 representative of the current measured by the sensor 185 in FIG. 1 and a pump speed curve 504 representative of the corresponding behavior (i.e., speed) of the vacuum pump 140. The behavior of the pump current curve 502 is generally representative of a gas load on the vacuum pump 140. Accordingly, an initial positive slope 502A indicates a relative increase in the gas load on the vacuum pump 140. Upon determining that the slope 502A is indicative of an increased gas load, the pump speed controller 177 may issue a control signal causing vacuum pump 140 to increase its speed. The resulting increase in pumping speed is represented by the positive slope 504A of the pump speed curve 504. The pumping speed then stabilizes at some speed (as represented by the curve plateau 504B), which may correspond to a maximum pumping speed. Subsequently, the pump current curve 502 begins a negative slope (slope 502B) indicative of a decreasing gas load on vacuum pump 140. The pump current curve 502 stabilizes at curve plateau 502C when a process pressure is attained in the processing chamber 150. Upon detecting the stabilized gas load (as indicated by the curve plateau 502C), the pump speed controller 177 issues a control signal causing vacuum pump 140 to decrease its speed, as represented by slope 504C. The resulting stabilized reduced pump speed (which is referred to herein as an idle speed of the vacuum pump 140) is represented by the curve plateau 504D. Decreasing the pump speed to the idle speed is achieved by decreasing the current applied to vacuum pump 140 (represented by the slope 502D), which results in a decrease in the power consumption of the vacuum pump 140. The pump current may stabilize at curve plateau 502E.

In the foregoing embodiment, the pump speed controller 177 is configured to change the pumping speed of the vacuum pump 140 in response to detecting changes in the gas load on the pump. In one embodiment, a change in the gas load, which requires a corresponding pumping speed change, may be detected by monitoring the slope, or rate of change, of the pump current curve 502. When a sufficient slope of sufficient duration is detected by the pump speed controller 177, the pump speed controller 177 may issue a control signal to change the pumping speed of the vacuum pump 140. In another embodiment, the pump speed controller 177 may be configured to determine a changing pump current within some time interval, regardless of the rate of change in pump current. That is, only the magnitude of the change in pump current may be monitored. Where a sufficient pump current change is detected, the pump speed controller 177 operates to change the pumping speed of vacuum pump 140.

In the embodiment described with respect to FIG. 5, the vacuum pump 140 is varied between only two speeds (represented by the plateau 504B and the plateau 504D). In another embodiment, the variable vacuum pump 140 may be varied between three or more speeds. One such embodiment will now be described with reference to FIG. 6 and FIG. 7.

Figure 6:
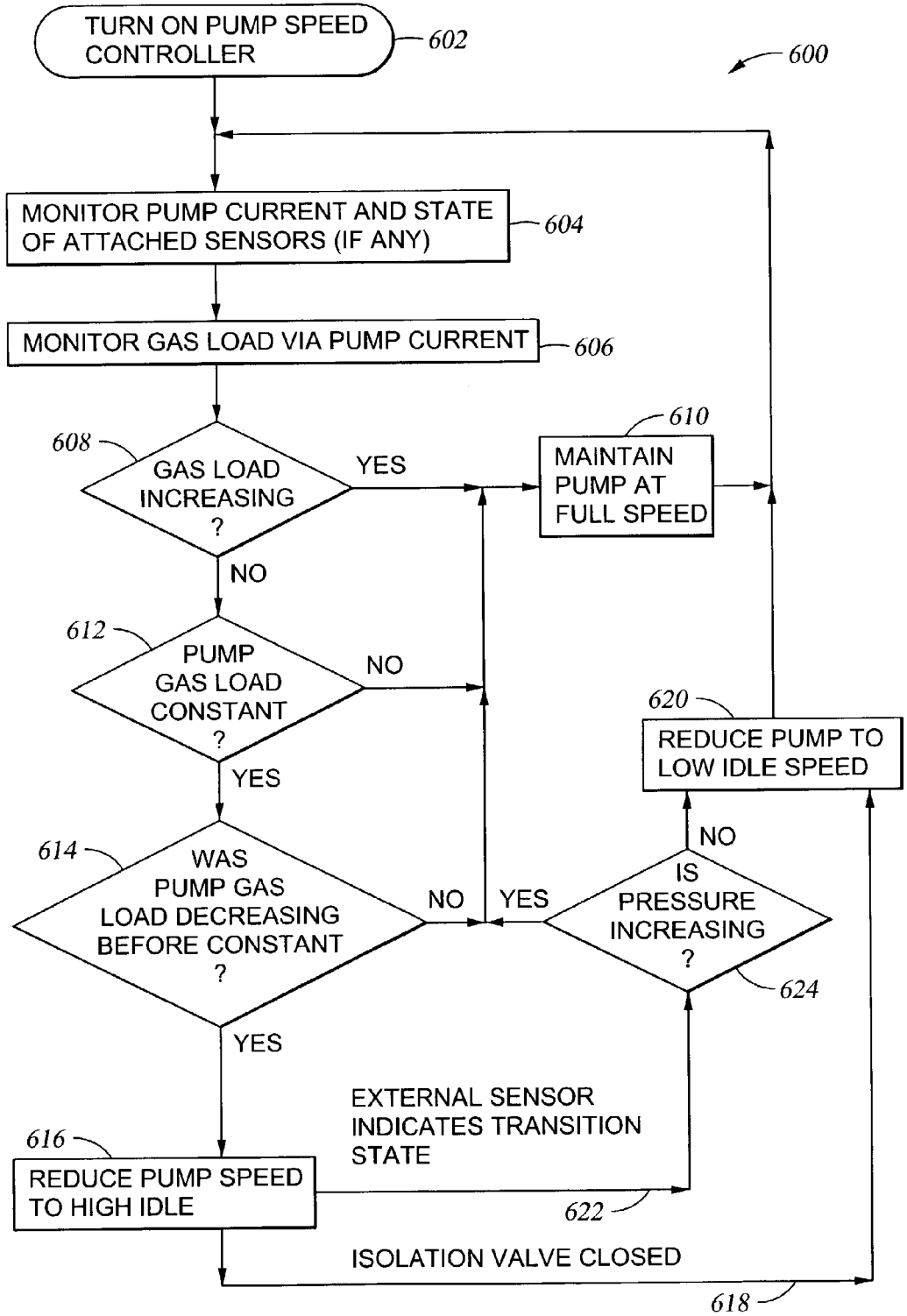
FIG. 6 depicts a flow chart illustrating the operation of a pump speed controller.
Figure 7:
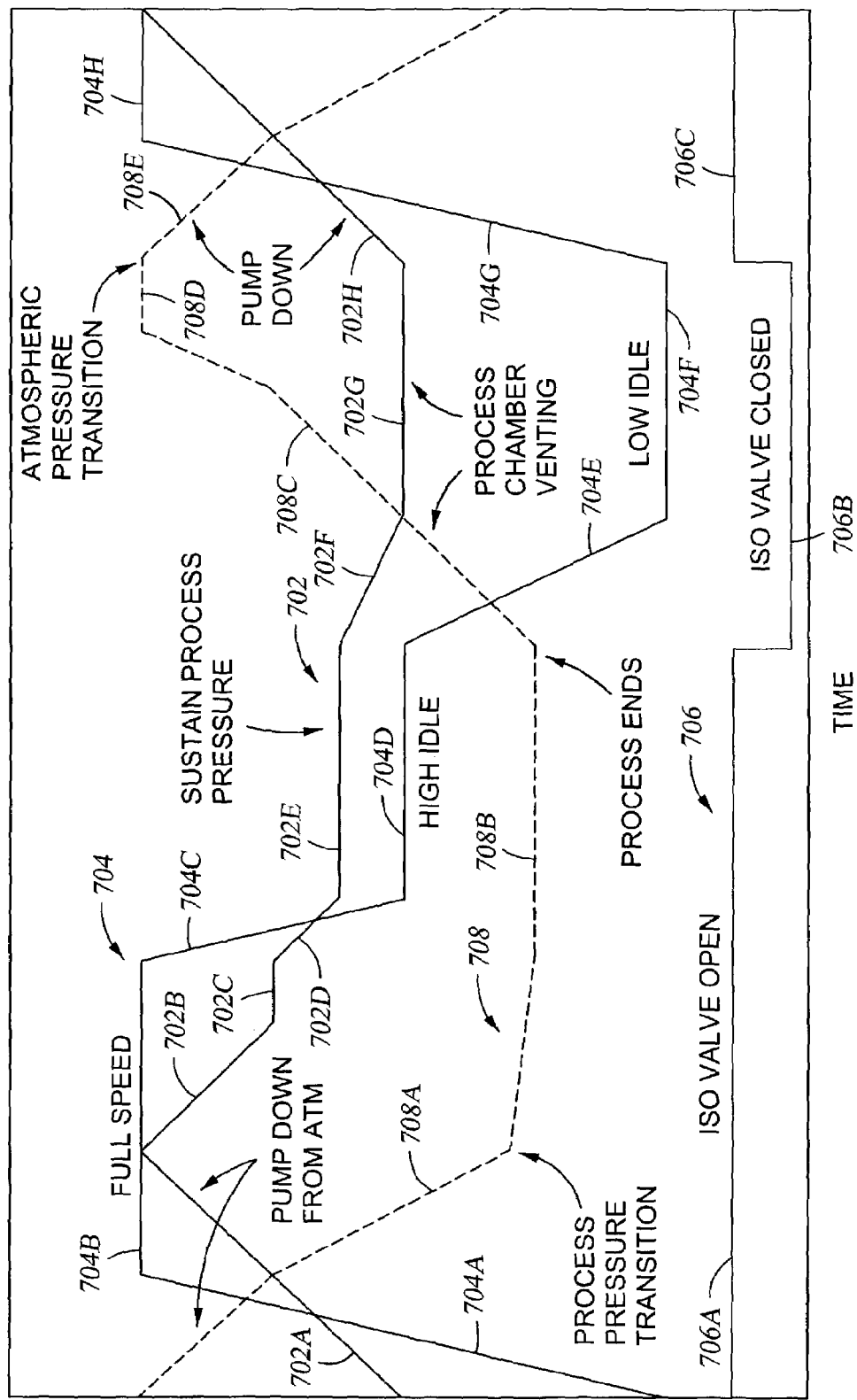
FIG. 7 depicts a graph of current, pump speed, pressure, and isolation valve position.

In particular, FIG. 6 illustrates a method 600 for operating the pump speed controller 177. Illustratively, the method 600 may be implemented by executing the pump speed control software 309 (shown in FIG. 3). FIG. 7 shows a plurality of curves representative of the steps of the method 600. Specifically, FIG. 7 shows a pump current curve 702, a pump speed curve 704, an isolation valve curve 706 and a pressure curve 708.

Prior to monitoring operating characteristics, it may be necessary to determine system requirements for chamber operating pressure states and associated vacuum pump idle speeds. As used herein, idle speeds (such as is represented by the curve plateau 504D in FIG. 5) are relatively reduced pump operating speeds, whereby power can be conserved and desired processing conditions (e.g., chamber pressure) can still be maintained. Having determined idle speeds associated with one or more desired process parameters, the pump speed controller 177 can be programmed accordingly. In addition, the pump speed controller 177 can be programmed to respond to external sensor parameters where external sensors (e.g., pressure devices 175A–B) may be used advantageously. The pump speed controller 177 may also be programmed with time delays to filter out spikes and other noise from the pump current sensor readings. Persons skilled in the art will recognize other parameters that can be used to configure the pump speed controller 177.

With reference to FIG. 6, the pump speed controller 177 may be turned on at step 602, at which time pump speed controller 177 may signal the vacuum pump 140 to operate at full speed. With reference to FIG. 7, the slope 704A indicates the increasing speed of vacuum pump 140, which reaches full speed at the plateau 704B. Illustratively, the valve assembly 174 is open (as represented by curve portion 706A), thereby allowing fluid communication between the vacuum pump 140 and the vacuum chamber 150. For purposes of illustration, it is assumed that the vacuum chamber 150 is at atmospheric pressure when the pumping process is initiated. Under these conditions, the vacuum chamber 150 may be pumped down, as reflected by the declining pressure curve portion 708A. Because of the gas load and the increasing pump speed, the current curve 702 necessarily ramps up as indicated by slope 702A.

Once the pump speed controller 177 is initialized and the vacuum pump 140 is activated, the pump speed controller 177 may begin monitoring the pump current and the state of any attached sensors at step 604. The monitored pump current may be processed at step 606 to determine gas load on the vacuum pump 140. At step 608, the pump speed controller 177 may determine whether the gas load is increasing. In one embodiment, such a determination is made by observing the slope of the pump current curve 702. Initially, the slope 702A indicates an increasing gas load. Accordingly, the vacuum pump 140 is maintained at full speed at step 610.

The foregoing process may be repeated until pump speed controller 177 determines that the gas load is not increasing, at which point the pump speed controller 177 determines (at step 612) whether the gas load is substantially constant, as indicated by the pump current curve 702. Such behavior is reflected in the flat curve portion 702C of the pump current curve 702 and occurs after the pump current curve 702 transitions from a positive slope 702A to a negative slope 702B. This transition occurs substantially commensurate with the achievement of a base pressure (curve portion 708B) within the vacuum chamber 150. At the base pressure, the vacuum pump 140 can be maintained at full speed with relatively less pump current.

If the pump speed controller 177 determines that the gas load is not substantially constant at step 612 (e.g., the pump current curve 702 is decreasing), then the vacuum pump 140 may be maintained at full speed (step 610) while the pump speed controller 177 monitors the decreasing pump current. When the current curve 702 does indicate a substantially constant gas load (as in the case of the flat curve portion 702C), then the pump speed controller 177 determines, at step 614, whether the gas load was decreasing before leveling off. Such behavior is exemplified by the slope 702B and the subsequent leveling off of the pump current curve 702 at the flat curve portion 702C. Where such behavior is observed, the pump speed may be reduced to high idle at step 616. The adjustment to the pumping speed is reflected in the slope 704C and the subsequent flat curve portion 704D. As a result of this reduction in pumping speed, a resulting reduction in power consumption may be achieved, reflected in the decrease of the pump current curve 702 shown by slope 702D. The pump current curve 702 then levels off at curve portion 702E.

The pressure, the pump speed and the pump current may subsequently be maintained at substantially constant values until the process within vacuum chamber 150 is complete. Upon completion of the process, the valve assembly 174 may be closed (indicated by curve portion 706B) to isolate the vacuum chamber 150 from the vacuum pump 140. In addition, the vacuum chamber 150 may be vented to allow the chamber to return to atmospheric pressure, as reflected by the slope 708C of the pressure curve 708. In some cases, these activities may put a gas load on the vacuum pump 140 that produces a detectable behavior in the pump current curve 702. If the pump speed controller 177 can detect a reduced gas load by observation of the pump current curve 702, then the pump speed controller 177 may operate to reduce the speed of vacuum pump 140 to a low idle. However, in many cases opening the valve assembly 174 does not have an immediate detectable effect on the pump current curve 702. Accordingly, in one embodiment the actuation of the valve assembly 174 may be used to trigger a change in the pumping speed of the vacuum pump 140. Specifically, if the pump speed controller 177 determines that the valve assembly 174 has been closed (e.g., by receiving a signal from the position sensor 187), then processing may proceed along logic line 618 to step 620 where the pump speed controller 177 reduces the pump speed to low idle, represented by the slope 704E and the flat curve portion 704F, respectively. Processing may then return to step 604 where the pump speed controller 177 again monitors the pump current and the state of any additional sensors. Accordingly, if an increasing gas load is subsequently detected by observation of an increasing pump current, then the vacuum pump 140 may be returned to full speed. For example, the pump speed controller 177 may detect an increased gas load when the valve assembly 174 is opened (curve portion 706C) after the vacuum chamber 150 has reached atmospheric pressure at 708D by observing the slope 702H of the pump current curve 702. In response, the pump speed controller 177 may signal the vacuum pump 140 to increase speed from low idle at curve portion 704F to full speed at curve portion 704H. The foregoing process may then be repeated any number of times.

In some cases, prior to completion of the process, the pressure within the vacuum chamber 150 may fluctuate beyond acceptable limits, but not significantly enough to be detected by observation of the pump current. Accordingly, in some embodiments, external sensors (e.g. the pressure devices 175A–B) may be used to detect transition states (i.e., unacceptable pressure fluctuations). If during high idle at step 616, the pump speed controller 177 receives an indication of a transition state from one or more external sensors, then processing proceeds along logic line 622 to step 624. At step 624, the pump speed controller 177 determines whether the vacuum chamber pressure is increasing. If so, the process may return to step 610 where the vacuum pump 140 resumes full speed. If the vacuum chamber pressure is not increasing, then the vacuum chamber pressure is necessarily decreasing, in which case the pump speed is reduced to low idle at step 620. The process may then return to step 604 where the pump speed controller 177 again monitors the pump current and the state of any attached sensors.

In another embodiment, control signals of semiconductor processing system 100 may be monitored by pump speed controller 177 to control the speed of vacuum pump 140. For example, electrical, pneumatic, hydraulic, fiber-optic, and other types of control signals commonly used to control the operation of valves, actuators, and other such devices within semiconductor processing system 100 may be monitored by pump speed controller 177. In this embodiment, one or more predetermined algorithms may be used to control the speed of vacuum pump 140 using the monitored control signals. The algorithms may be determined according to attributes (e.g., system configuration, chamber type, etc.) and desired operating characteristics of semiconductor processing system 100. Variations of this embodiment will be described in greater detail below.

As previously discussed, semiconductor processing system 100 may include a variety of vacuum chambers, such as etch chambers, physical vapor deposition chambers, chemical vapor deposition chambers, ion implantation chambers, transfer chambers, pre-clean chambers, de-gas chambers, load lock chambers, orientation chambers and the like. These chambers may include a variety of mechanical components such as control valves, actuators, motors, and other such devices. For example, as described above with respect to FIG. 1, vacuum chamber 150 may include a valve assembly 174 disposed in foreline 108 to control fluid communication between vacuum pump 140 and vacuum chamber 150. Vacuum chamber 150 may include other mechanical components such as a gas valve 130 for selectively flowing gases from gas source 166 through inlet ports 178 into vacuum chamber 150 and an actuator 128 for raising and lowering pedestal 168 within vacuum chamber 150.

Control valves, actuators, motors, and other such devices structured to semiconductor processing system 100 may be controlled by means of electrical, pneumatic, hydraulic, fiber-optic, and other types of commonly used control signals. The control signals may be generated by system controller 176 to control the operation of semiconductor processing system 100. For example, system controller 176 may generate a control signal that causes valve assembly 174 to open in order to evacuate process gases from vacuum chamber 150 through exhaust 126 after the completion of a process recipe. Alternatively, system controller 176 may generate a control signal that causes a gas valve to open, thereby allowing gases from gas source 166 to flow through inlet ports 178 into vacuum chamber 150. Or system controller 176 may generate a control signal that causes an actuator 128 to raise or lower pedestal 168 within vacuum chamber 150. Control signals generated by system controller 176 may be directed to various components within semiconductor processing system 100 along various signal control pathways, such as electrical wires, pneumatic tubes, hydraulic lines and fiber-optic cables.

Pump speed controller 177 may monitor the control signals directed to various components within semiconductor processing system 100 by means of sensors, switches, transducers, and other such devices coupled to the control signal pathways. These devices are herein collectively referred to as sensors for descriptive purposes. For example, semiconductor processing system 100 may include a pneumatic tube that directs compressed air to valve assembly 174 on vacuum chamber 150, thereby causing valve assembly 174 to open or close. A pneumatic switch may be coupled to the tube, and the pneumatic switch may be structured to direct a signal to pump speed controller 177 when a compressed air control signal is directed to valve assembly 174. Control signals directed to other components within semiconductor processing system 100 may also be monitored by pump speed controller 177. For example, pump speed controller 177 may monitor electrical control signals directed to a gas control valve 130 which controls the flow of gas from gas source 166 into vacuum chamber 150. Alternatively, control signals transmitted through control signal pathways may be monitored directly to determine an appropriate pumping speed for vacuum pump 140. For example, a control signal transmitted through a control signal pathway may be split and the split control signal may be routed to pump speed controller 177.

Signals from sensors coupled to control signal pathways may be directed to pump speed controller 177 via one or more interfaces. For example, referencing FIG. 3, the fourth interface 310D may be configured to direct signals from sensors coupled to control signal pathways to pump speed controller 177.

Signals from sensors coupled to control signal pathways within semiconductor processing system 100 may be used to determine an appropriate pumping speed for vacuum pump 140. Sensor signals responsive to detected control signals may be processed, causing CPU 302 (by execution of pump speed control software 309) to issue instructions for operating vacuum pump 140 in a specified manner. For example, the CPU may issue instructions to vacuum pump 140 in the form of control signals for changing an operating speed of vacuum pump 140.

In one embodiment, pump speed controller 177 may utilize one or more algorithms to control the pumping speed of vacuum pump 140 based upon signals from sensors coupled to control signal pathways within semiconductor processing system 100. The algorithms may be structured according to various characteristics of semiconductor operating system 100, such as system configuration, chamber type, desired operating characteristics, and other such parameters.

In one embodiment, the algorithms may be configured as software or firmware in memory 304 of pump speed controller 177. In this embodiment, the algorithms may be altered or replaced by interfacing with pump speed controller 177 through, for example, fifth interface 310E with a laptop computer, personal digital assistant (PDA), or other similar electronic communication devices. Alternatively, the algorithms may be altered or replaced by replacing CPU 302 or memory 304 in pump speed controller 177. In alternative embodiments, the algorithms may be configured as a digital or analog circuit coupled to pump speed controller 177.

In one embodiment, several algorithms are configured as software or firmware resident in memory 304 of pump speed controller 177. In this embodiment, pump speed controller 177 includes a user selectable switch for selecting one of the algorithms representative of a desired operational mode for pump speed controller 177. For example, pump speed controller 177 may include a user selectable dip-switch that may be configured to select one of a plurality of algorithms representative of various unique operational modes for operating vacuum pump 140.

During operation, control signals may be monitored by switches and/or sensors coupled to control signal pathways within semiconductor processing system 100. Pump speed controller 177 may process signals from the switches and/or sensors to determine changes in pumping requirements. Pump speed controller 177 may subsequently change the speed of vacuum pump 140 responsive to the monitored control signals, as determined by a user-selected algorithm. For example, pump speed controller may direct the motor driver 204 to increase motor torque output responsive to a need for increased pumping capacity, as determined by a user-selected algorithm.

Figure 8:
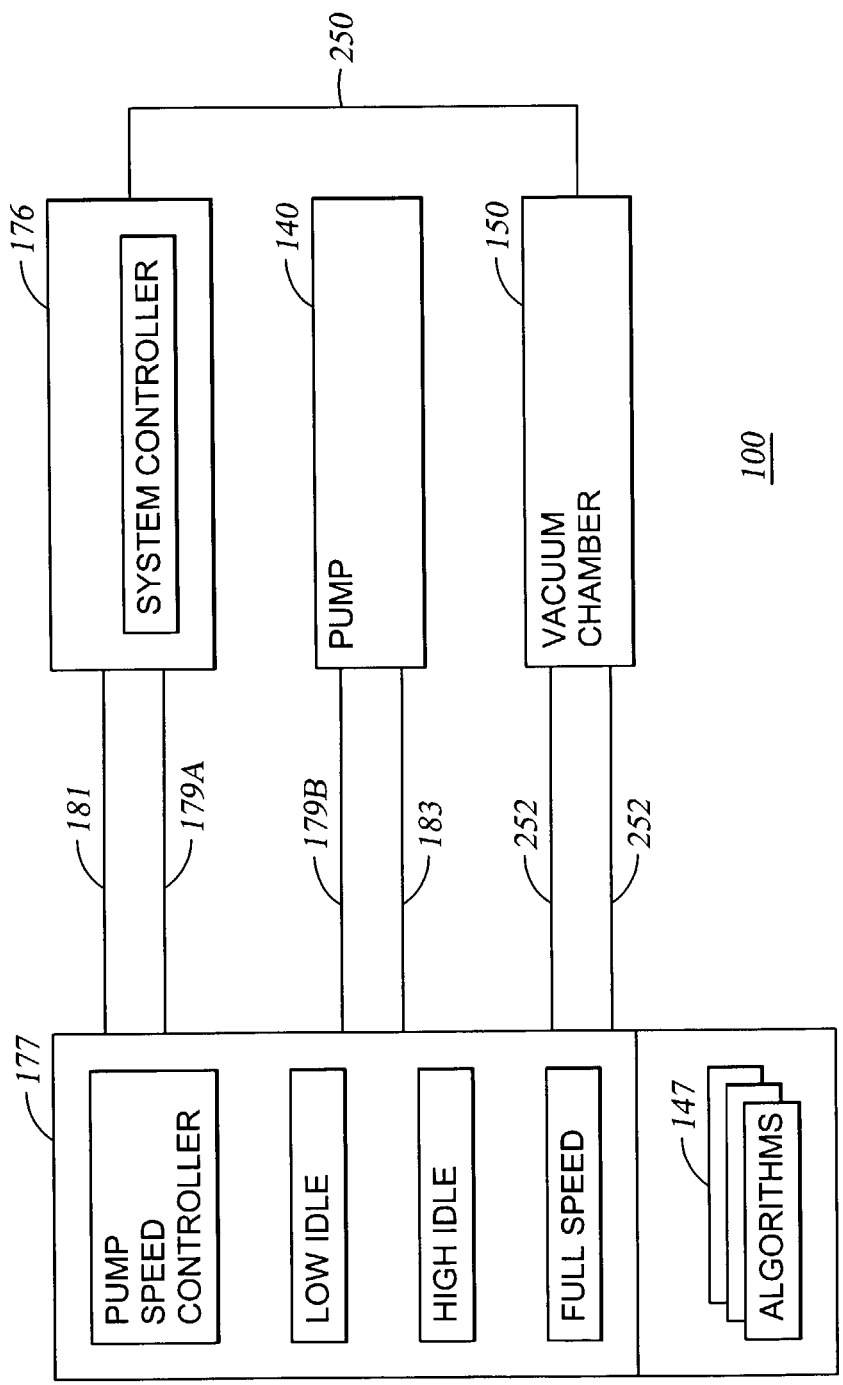
FIG. 8 depicts a semiconductor processing system coupled to one embodiment of a vacuum system.

FIG. 8 depicts one embodiment of a semiconductor processing system 100 comprising pump speed controller 177, system controller 176, pump 140, and one or more vacuum chambers 150. Transmission medium 181 and power supply line 179A may be used to transmit control signals and electrical power, respectively, from system controller 176 to pump speed controller 177. Transmission medium 183 and power supply line 179B may be used to transmit control signals and electrical power, respectively from pump speed controller 177 to vacuum pump 140. Control signals may be generated by system controller 176 and directed to vacuum chamber 150 through one or more control signal pathways 250. The control signals may control the operation of various valves, actuators, motors, and other such devices coupled to vacuum chamber 150. Pump speed controller 177 may monitor control signals transmitted through control signal pathways 250 by means of sensors coupled to control signal pathways 250. Signals from the sensors (sensor signals) responsive to the monitored control signals may be transmitted through one or more sensor signal pathways 252 to pump speed controller 177. Pump speed controller 177 may use the sensor signals to determine an appropriate pumping speed for vacuum pump 140, and a pumping speed control signal may be subsequently directed to pump 140 through transmission medium 183. In one embodiment, pump speed controller 177 may utilize one or more predetermined algorithms 147 to control the pumping speed of vacuum pump 140 based upon the sensor signals. The algorithms 147 may be structured according to various characteristics, such as the configuration and desired operating characteristics of vacuum chamber 150. Alternative embodiments incorporating features described above with reference to FIG. 12 will be described in greater detail below.

Figure 9:
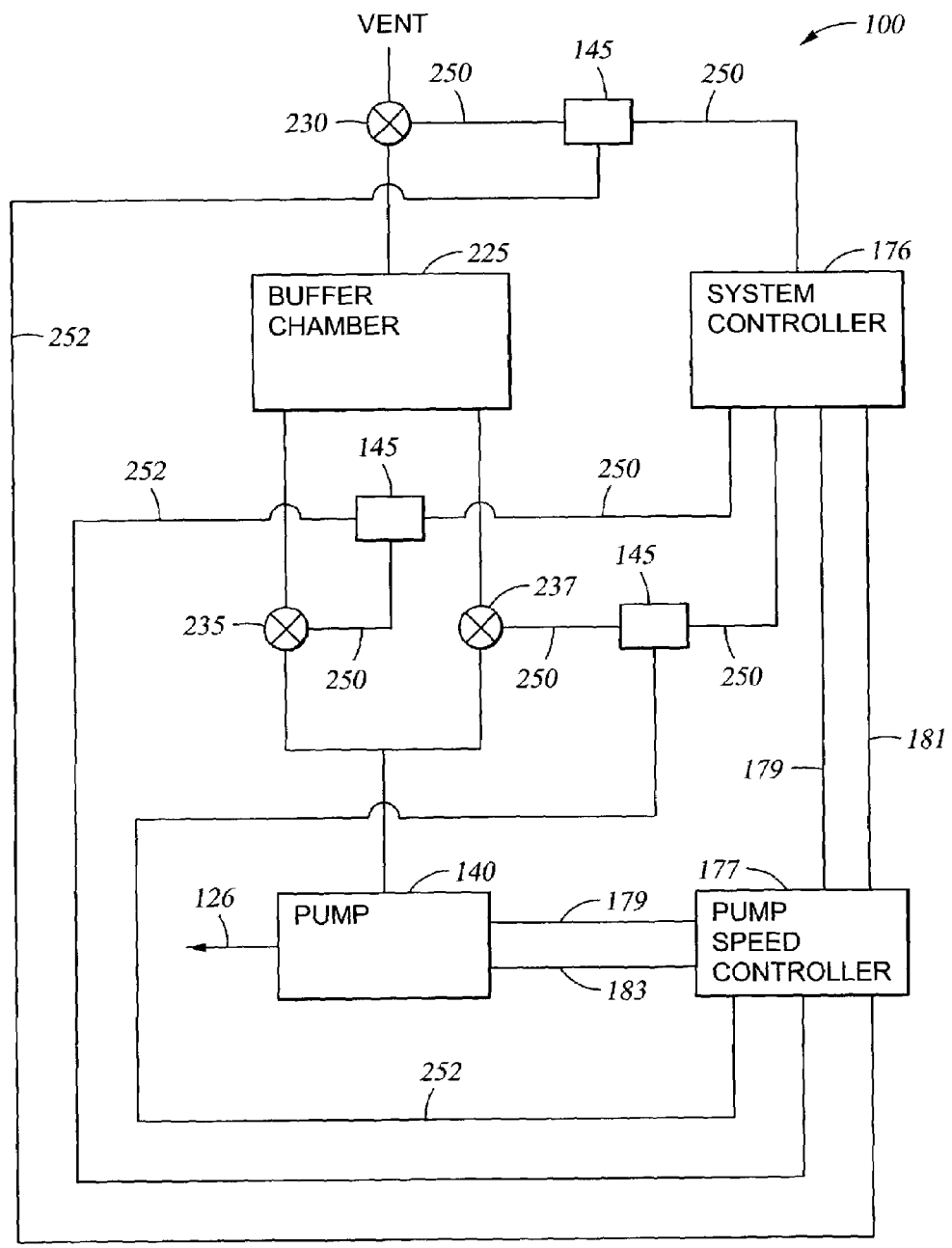
FIG. 9 depicts a buffer chamber coupled to one embodiment of a vacuum system.

FIG. 9 depicts another embodiment of semiconductor processing system 100 similar to the embodiment described above in reference to FIG. 8. As shown, semiconductor processing system 100 may comprise a buffer chamber 225 fluidly coupled to a vent valve 230 for controlling the flow of a vent gas into an interior portion of buffer chamber 225. Buffer chamber 225 may be a particular species of vacuum chamber 150 shown in FIG. 8. A slow pump valve 235 and a fast pump valve 237 may be fluidly coupled to buffer chamber 225 and a vacuum pump 140 to control the rate at which buffer chamber 225 may be evacuated by vacuum pump 140. Slow pump valve 235 may feature a higher flow restriction than fast pump valve 237. Consequently, slow pump valve 235 be used to evacuate buffer chamber 225 at a first pumping rate and fast pump valve 237 may be used to evacuate buffer chamber 225 at a second pumping rate, where the first pumping rate is slower than the second pumping rate.

Control signals from system controller 176 may be directed to vent valve 230, slow pump valve 235, and fast pump valve 237 through control signal pathways 250. The control signals may comprise, for example, voltage signals or pneumatic signals. Pump speed controller 177 may monitor the control signals by means of sensors 145 coupled to control signal pathways 250. Alternatively, pump speed controller 177 may monitor the control signals by means of sensors directly coupled to vent valve 230, slow pump valve 235, and fast pump valve 237. Sensor signals responsive to the control signals directed to vent valve 230, slow pump valve 235, and fast pump valve 237 may be transmitted through sensor signal pathways 252 to pump speed controller 177.

Pump speed controller 177 may utilize a pre-determined algorithm to control the pumping speed of vacuum pump 140 responsive to the sensor signals. For example, pump speed controller 177 may determine a pumping speed responsive to the sensor signals and direct a pumping speed control signal to pump 140 through transmission medium 183. The algorithm may be structured according to the configuration and desired operating characteristics of buffer chamber 225.

Figure 10:
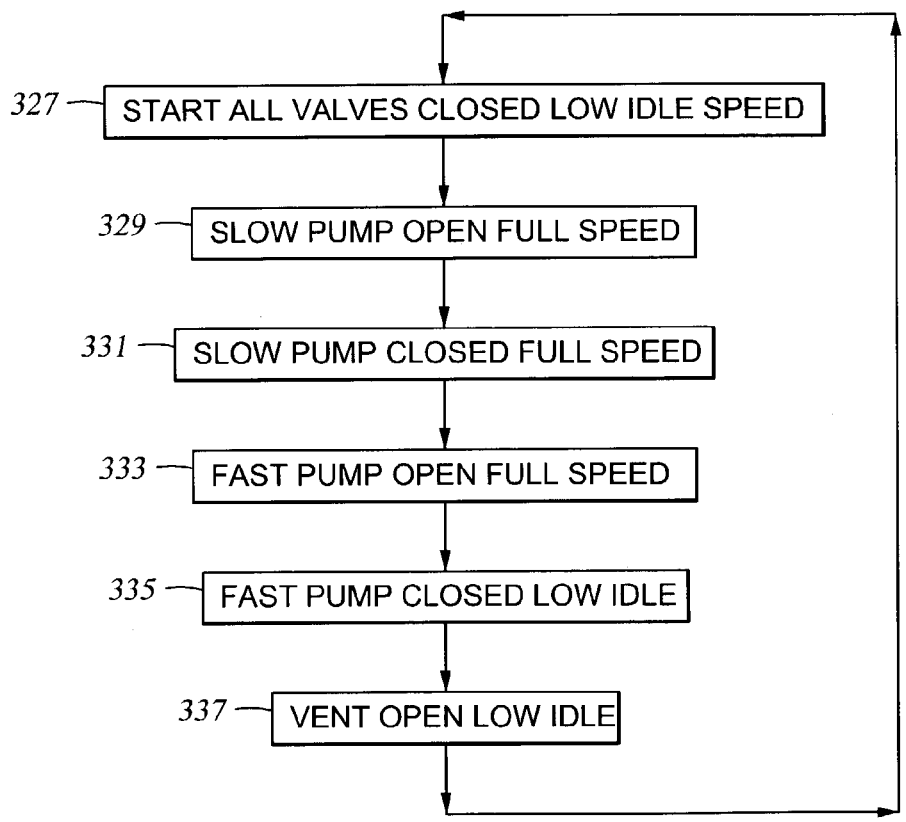
FIG. 10 depicts a flow chart illustrating an algorithm of a pump speed controller.

FIG. 10 illustrates one embodiment of an algorithm 325 for controlling the pumping speed of vacuum pump 140 with respect to buffer chamber 225. Algorithm 325 may be used to determine a pump speed setpoint based upon sensor signals responsive to control signals directed to vent valve 230, slow pump valve 235, and fast pump valve 237. Referencing FIG. 10, at step 327 sensor signals may indicate that vent valve 230, slow pump valve 235, and fast pump valve 237 are closed and pump speed controller 177 may signal vacuum pump 140 to operate at low idle speed. At step 329 sensor signals may indicate that slow pump valve 235 is open and pump speed controller 177 may signal vacuum pump 140 to operate at full speed. At step 331 sensor signals may indicate that slow pump valve 235 is closed and pump speed controller 177 may signal vacuum pump 140 to operate at full speed. At step 333 sensor signals may indicate that fast pump valve 237 is open and pump speed controller 177 may signal vacuum pump 140 to operate at full speed. At step 335 sensor signals may indicate that fast pump valve 237 is closed and pump speed controller 177 may signal vacuum pump 140 to operate at low idle speed. And at step 337, sensor signals may indicate that vent valve 230 is open and pump speed controller 177 may signal vacuum pump 140 to operate at low idle speed. Algorithm 325 may subsequently repeat steps 327–337 during a later process involving pumping down and venting buffer chamber 225. It is to be noted that the order of steps 327, 329, 331, 333, 335, and 337 shown in algorithm 325 is merely illustrative and steps 327, 329, 331, 333, 335, and 337 may be arranged in other orders as required for controlling the pumping speed of vacuum pump 140 with respect to a particular process.

Figure 11:
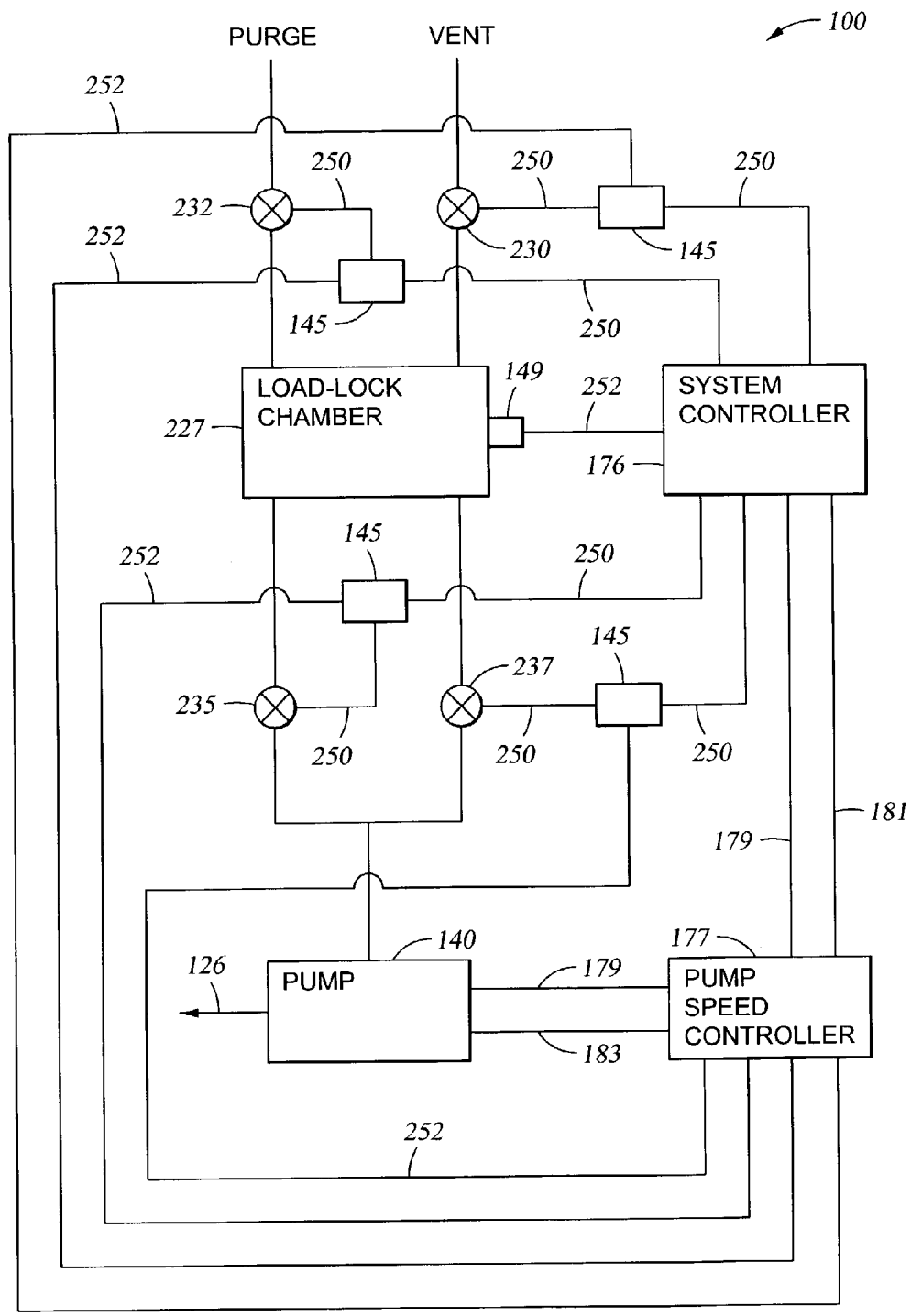
FIG. 11 depicts a load lock chamber coupled to one embodiment of a vacuum system.

FIG. 11 depicts yet another embodiment of semiconductor processing system 100 similar to the embodiments described above in reference to FIG. 8 and FIG. 9. As shown, semiconductor processing system 100 may comprise a load lock chamber 227 fluidly coupled to a vent valve 230 for controlling the flow of a vent gas into an interior portion of load lock chamber 227 and a purge valve 232 for controlling the flow of a purge gas into an interior portion of load lock chamber 227. Load lock chamber 227 may be a particular species of vacuum chamber 150 shown in FIG. 8. A slow pump valve 235 and a fast pump valve 237 may be fluidly coupled to load lock chamber 227 and a vacuum pump 140 to control the rate at which load lock chamber 227 may be evacuated by vacuum pump 140.

As described above with respect to FIG. 9, control signals from system controller 176 may be directed to vent valve 230, purge valve 232, slow pump valve 235, and fast pump valve 237 through control signal pathways 250. Pump speed controller 177 may monitor the control signals by means of sensors 145 coupled to control signal pathways 250. Sensor signals responsive to the control signals directed to vent valve 230, purge valve 232, slow pump valve 235, and fast pump valve 237 may be transmitted through sensor signal pathways 252 to pump speed controller 177. Pump speed controller 177 may also monitor the pressure within load lock chamber 227 by means of a pressure sensor 149. A pressure sensor signal may also be transmitted through a sensor signal pathway to pump speed controller 177. Pump speed controller 177 may utilize a pre-determined algorithm to control the pumping speed of vacuum pump 140 responsive to the sensor signals. The algorithm may be structured according to the configuration and desired operating characteristics of load lock chamber 227.

Figure 12:
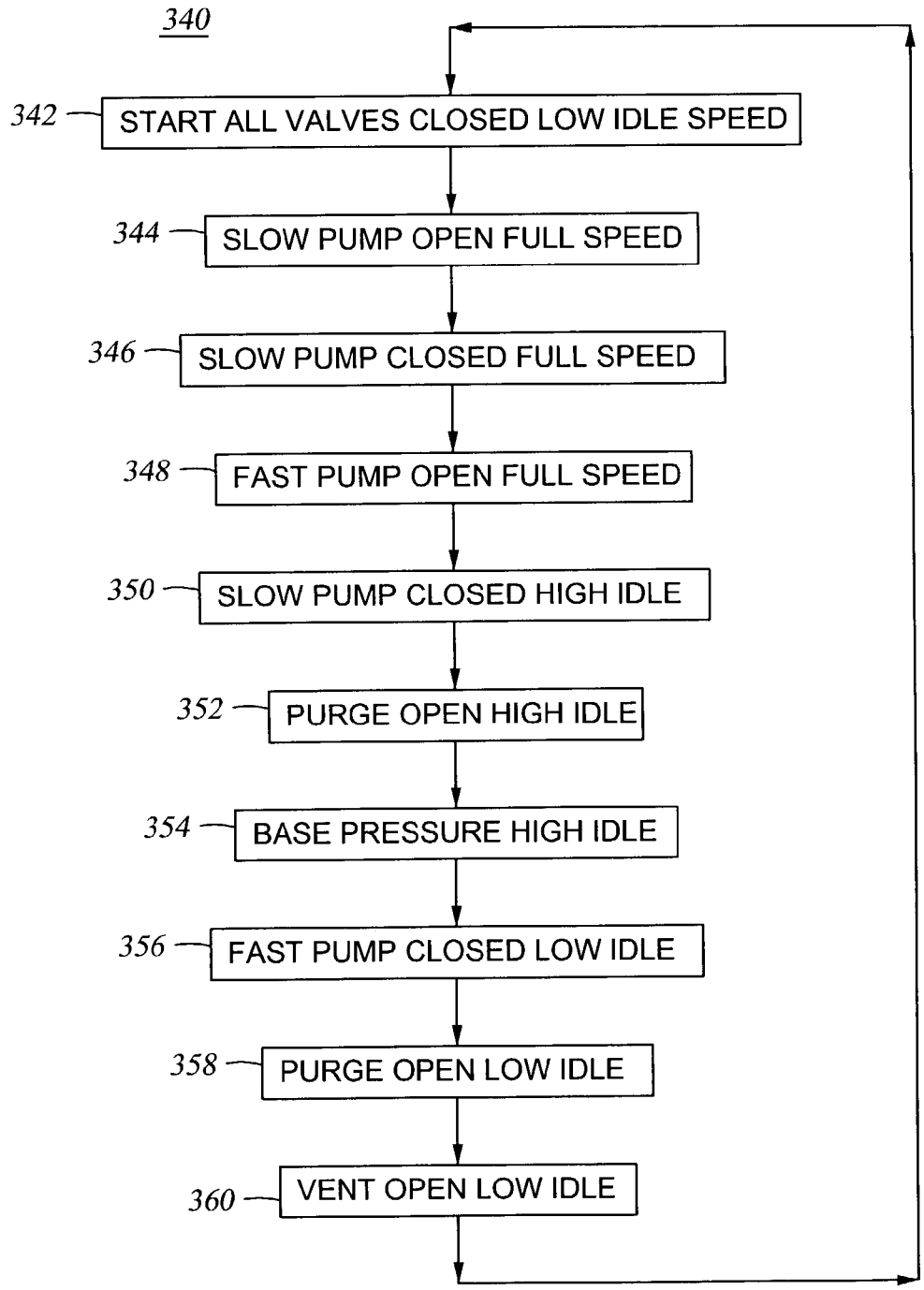
FIG. 12 depicts a flow chart illustrating an algorithm of a pump speed controller.

FIG. 12 illustrates one embodiment of an algorithm 340 for controlling the pumping speed of vacuum pump 140 with respect to load lock chamber 225 when load lock chamber 225 is operated in a continuous purge mode. Algorithm 340 may be used to determine a pump speed setpoint based upon sensor signals responsive to control signals directed to vent valve 230, purge valve 232, slow pump valve 235, fast pump valve 237, and a pressure sensor fluidly coupled to load lock chamber 227 and electrically coupled to pump speed controller 177. Referencing FIG. 11, at step 342 sensor signals may indicate that vent valve 230, purge valve 232, slow pump valve 235, fast pump valve 237 are closed and pump speed controller 177 may signal vacuum pump 140 to operate at low idle speed. At step 344 sensor signals may indicate that slow pump valve 235 is open and pump speed controller 177 may signal vacuum pump 140 to operate at full speed. At step 346 sensor signals may indicate that slow pump valve 235 is closed and pump speed controller 177 may signal vacuum pump 140 to operate at full speed. At step 348 sensor signals may indicate that fast pump valve 237 is open and pump speed controller 177 may signal vacuum pump 140 to operate at full speed. At step 350 sensor signals may indicate that slow pump valve 235 is closed and pump speed controller 177 may signal vacuum pump 140 to operate at high idle. At step 352 sensor signals may indicate that purge valve 232 is open and pump speed controller 177 may signal vacuum pump 140 to operate at high idle. At step 354 sensor signals may indicate that base pressure has been achieved within load lock chamber 227 and pump speed controller 177 may signal vacuum pump 140 to operate at high idle. At step 356 sensor signals may indicate that fast pump valve 237 is closed and pump speed controller 177 may signal vacuum pump 140 to operate at low idle. At step 358 sensor signals may indicate that purge valve 232 is open and pump speed controller 177 may signal vacuum pump 140 to operate at low idle. And at step 360 sensor signals may indicate that vent valve 230 is open and pump speed controller 177 may signal vacuum pump 140 to operate at low idle. Algorithm 340 may subsequently repeat steps 342–360 during a later process involving pumping down and venting load lock chamber 227 in a continuous purge mode. It is to be noted that the order of steps 342, 344, 346, 348, 350, 352, 354, 356, 358 and 360 shown in algorithm 340 is merely illustrative and steps 342, 344, 346, 348, 350, 352, 354, 356, 358 and 360 may be arranged in other orders as required for controlling the pumping speed of vacuum pump 140 with respect to a particular process.

Figure 13:
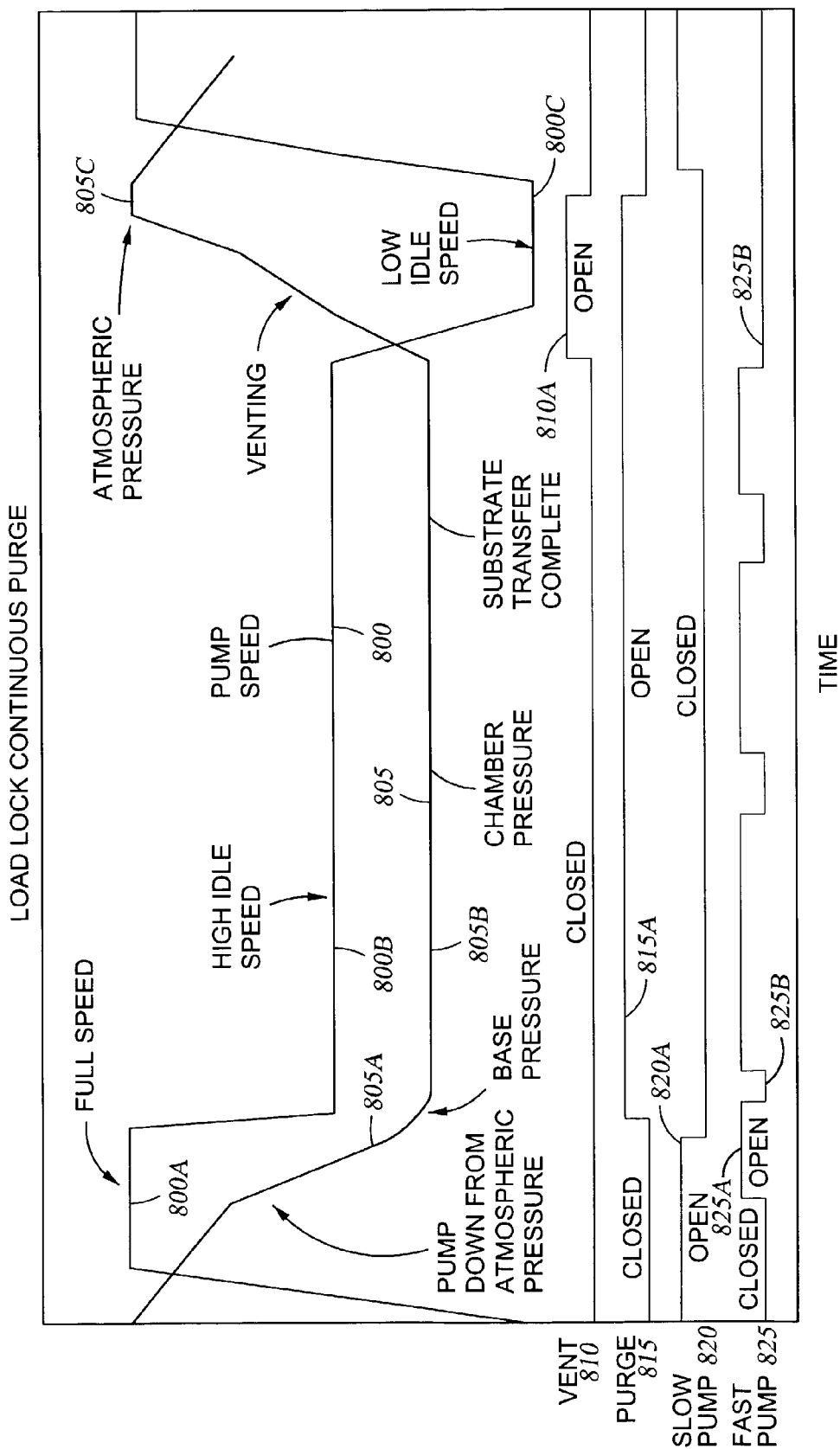
FIG. 13 depicts a graph of pump speed, chamber pressure, fast vent valve position, purge valve position, slow pump valve position, and isolation valve position.

FIG. 13 shows a plurality of curves representative of the steps of operating load lock chamber 227 according to algorithm 340. Specifically, FIG. 13 shows a pump speed curve 800, a chamber pressure curve 805, a vent valve curve 810, a purge valve curve 815, a slow pump valve curve 820, and a fast pump valve curve 825. Initially, the pressure within load lock chamber 227 is approximately equivalent to atmospheric pressure.

At slow pump valve curve portion 820A, slow pump valve 235 is opened and pump speed controller 177 signals vacuum pump 140 to operate at full speed. Consequently, pump speed curve 800 increases until vacuum pump 140 reaches full speed at pump speed curve portion 800A. Consequently, chamber pressure curve 805 decreases. At fast pump valve curve portion 825A, fast pump valve 237 is opened, further decreasing chamber pressure curve 805. At chamber pressure curve portion 805B base pressure is achieved. Similarly, at fast pump valve curve portion 825B, fast pump valve 237 is closed, and at purge valve curve portion 815A, purge valve 232 is opened. Consequently, pump speed controller 177 signals vacuum pump 140 to operate at high idle speed, as shown by pump speed curve portion 800B. At vent valve curve portion 810A vent valve 230 is opened, and at fast pump valve curve portion 825B fast pump valve 237 is closed. Consequently, pump speed controller 177 signals vacuum pump 140 to operate at low idle speed, as shown by pump speed curve portion 800C. Vent valve 230 may remain open until chamber pressure curve 810 reaches atmospheric pressure at chamber pressure curve portion 805C. The process may be subsequently repeated during a later process involving pumping down and venting load lock chamber 227.

In a particular embodiment of the invention, pump speed controller 177 is configured to monitor pneumatic valves within semiconductor processing system 100 to determine pumping requirements for vacuum pump 140. Pneumatic valve sensors are coupled to pneumatic air supply lines that control multiple system valves. The pneumatic valve sensors indicate whether the system valves are open or closed. A valve sensor cable is structured to transmit sensor signals from the pneumatic valve sensors to pump speed controller 177.

In this embodiment pump speed controller 177 controls the speed of vacuum pump 140 by means of a voltage signal directed to vacuum pump 140 through an interface, such as interface 310B shown in FIG. 3. Pump speed controller 177 may direct a zero volt signal to vacuum pump 140 to achieve full pump speed; 3 to 8 volts to achieve high idle speed, and eight to ten volts to achieve low idle speed. Vacuum pump 140 and pump speed controller 177 are configured such that a malfunction resulting in the failure of speed controller 177 results in vacuum pump 140 operating at full pump speed. Additionally, pump speed controller 177 includes an override switch that allows a user to turn the pump speed controller 177 off, thereby causing the vacuum pump 140 to operate a full pump speed.

Pump speed controller 177 is configured such that several user selectable algorithms may be configured for altering the speed of vacuum pump 140 responsive to signals from the pneumatic valve sensors. In one embodiment, pump speed controller 177 includes a five-position user selectable dip-switch that may be configured to select one of up to thirty-two algorithms representative of unique operational modes for operating vacuum pump 140. The algorithms are structured according to various characteristics and operating requirements of semiconductor operating system 100.

In one embodiment, pump speed controller 177 may include a low idle timer for monitoring the length of time vacuum pump 140 has continuously operated at low idle speed. If the vacuum pump 140 operates at low idle speed for more than a given length of time, the pump speed controller may be configured to increase the pumping speed to full pump speed for a period of time. For example, if vacuum pump 140 operates continuously at low idle speed for a period of four hours, pump speed controller 177 may be configured to increase the pumping speed to full pump speed for approximately one minute. This may prevent pressure increases in the foreline due to foreline leakage, which could result in undesirable backstreaming, chamber contamination, and system errors.

Although aspects of the invention have been described with reference to a vacuum chamber 150, other embodiments are contemplated. For example, in one embodiment, a pump speed controller of the invention may be used advantageously in an air conditioning system. In such a configuration, the pump speed controller may operate the speed of a compressor in a manner that advantageously reduces power consumption. Accordingly, persons skilled in the art will recognize that the invention has application to a variety of motor-based technologies.

While the foregoing is directed to embodiments of the present invention, other and further embodiments of the invention may be devised without departing from the basic scope thereof, and the scope thereof is determined by the claims that follow.

What is claimed is:

1. A pump speed controller for controlling the pumping speed of a variable speed vacuum pump coupled to a semiconductor processing system comprising a chamber and system controller, the pump speed controller comprising:
    a processor;
    a sensor interface coupled to the processor for receiving sensor input from at least one sensor, wherein each of the at least one sensors is configured to monitor one or more control signals within the semiconductor processing system;
    instructions for configuring the processor to generate a pump speed control signal in response to the sensor input; and
    a pump interface for transmitting the pump speed control signal to the variable speed vacuum pump.

2. The pump speed controller of claim 1, wherein the at least one sensor monitors an electrical control signal within the semiconductor processing system.

3. The pump speed controller of claim 1, wherein the at least one sensor monitors a pneumatic control signal within the semiconductor processing system.

4. The pump speed controller of claim 1, wherein the pump speed control signal controls the pumping speed of the variable speed vacuum pump.

5. The pump speed controller of claim 1, wherein the instructions comprise a plurality of selectable algorithms.

6. A pump speed controller for controlling the pumping speed of a variable speed vacuum pump coupled to a semiconductor processing system comprising a chamber and system controller, the pump speed controller comprising:
- a sensor interface for receiving sensor input from at least one sensor, wherein the at last one sensor monitors one or more control signals within the semiconductor processing system;
- a processor coupled to the sensor interface, wherein the processor receives at least one sensor signal from the sensor interface, and wherein the processor uses one or more algorithms to determine a pump speed responsive to the at least one sensor signal; and
- a pump interface couple to the processor for transmitting a pump speed control signal generated by the processor to the variable speed vacuum pump, wherein the pump speed control signal corresponds to the determined pump speed.

7. The pump speed controller of claim 6, wherein the at least one sensor monitors an electrical control signal within the semiconductor processing system.

8. The pump speed controller of claim 6, wherein the at least one sensor monitors a pneumatic control signal within the semiconductor processing system.

9. The pump speed controller of claim 6, wherein the one or more control signals within the semiconductor processing system control a vent valve coupled to a vacuum chamber.

10. The pump speed controller of claim 6, wherein the one or more control signals within the semiconductor processing system control a purge valve coupled to a vacuum chamber.

11. The pump speed controller of claim 6, wherein the one or more control signals within the semiconductor processing system control a slow pump valve disposed between a vacuum chamber and the variable speed vacuum pump.

12. The pump speed controller of claim 6, wherein the one or more control signals within the semiconductor processing system control a fast pump valve disposed between a vacuum chamber and the variable speed vacuum pump.

13. The pump speed controller of claim 6, wherein the pump speed control signal generated by the processor controls the pumping speed of the variable speed vacuum pump.

14. The pump speed controller of claim 6, wherein the one or more algorithms are configured as software in a memory coupled to the processor.

15. The pump speed controller of claim 6, wherein the one or more algorithms are configured as firmware in the processor.

16. The pump speed controller of claim 6, wherein the pump speed controller further comprises a user selectable switch for selecting one of the one or more algorithms.

17. The pump speed controller of claim 16, wherein the user selectable switch comprises a dip-switch.

18. The pump speed controller of claim 6, wherein the processor determines the pump speed by selecting a pre-defined setpoint.

19. A semiconductor processing system comprising:
- a vacuum chamber;
- a variable speed vacuum pump coupled to the vacuum chamber;
- a system controller coupled to the vacuum chamber, wherein the system controller transmits control signals to apparatus servicing the vacuum chamber; and
- a pump speed controller coupled to the variable speed vacuum pump, wherein the pump speed controller monitors the control signals transmitted by the system controller, and wherein the pump speed controller determines a pump speed responsive to the monitored control signals.

20. The semiconductor processing system of claim 19, wherein the pump speed controller uses one or more algorithms to determine the pump speed.

21. The semiconductor processing system of claim 20, wherein the pump speed controller includes a user selectable switch for selecting one of the one or more algorithms.

22. The semiconductor processing system of claim 19, wherein the control signals transmitted to apparatus servicing the vacuum chamber comprise electrical control signals.

23. The semiconductor processing system of claim 19, wherein the control signals transmitted to apparatus servicing the vacuum chamber comprise pneumatic control signals.

24. The semiconductor processing system of claim 19, wherein the pump speed controller uses one or more sensors for monitoring the control signals transmitted by the system controller to apparatus servicing the vacuum chamber.

25. The semiconductor processing system of claim 19, wherein the control signals transmitted by the system controller to apparatus servicing the vacuum chamber control a vent valve coupled to apparatus servicing the vacuum chamber.

26. The semiconductor processing system of claim 19, wherein the control signals transmitted by the system controller to apparatus servicing the vacuum chamber control a slow pump valve disposed between the vacuum chamber and the variable speed vacuum pump.

27. The semiconductor processing system of claim 19, wherein the control signals transmitted by the system controller to apparatus servicing the vacuum chamber control a fast pump valve disposed between the vacuum chamber end the variable speed vacuum pump.

28. The semiconductor processing system of claim 19, wherein the pump speed controller transmits a pump speed control signal proportional to the determined pump speed to the variable speed vacuum pump.

29. A method of operating a variable speed vacuum pump coupled to a semiconductor processing system comprising a chamber and system controller, the method comprising:
- receiving sensor input from at least one sensor monitoring a first control signal of the semiconductor processing system;
- determining a pump speed control signal in response to the sensor input; and
- transmitting the pump speed control signal to the variable speed vacuum pump, wherein an algorithm determines the pump speed control signal.

30. A method of operating a variable speed vacuum pump coupled to a semiconductor processing system comprising a chamber and system controller, the method comprising:
- receiving sensor input from at least one sensor monitoring a first control signal of the semiconductor processing system; wherein the first control signal controls the operation of a vent valve coupled to a vacuum chamber;

determining a pump speed control signal in response to the sensor input; and transmitting the pump speed control signal to the variable speed vacuum pump.

31. A method of operating a variable speed vacuum pump coupled to a semiconductor processing system comprising a chamber and system controller, the method comprising:

receiving sensor input from at least one sensor monitoring a first control signal of the semiconductor processing system; wherein the first control signal controls the operation of a pump valve disposed between a vacuum chamber and the variable speed vacuum pump;

determining a pump speed control signal in response to the sensor input; and transmitting the pump speed control signal to the variable speed vacuum pump.

32. A computer readable medium containing a program which, when executed, performs an operation for controlling a variable speed pump in a semiconductor processing system comprising a vacuum chamber in fluid communication with the variable speed pump and a system controller, the operation comprising:

receiving sensor input from al least one sensor monitoring a first control signal of the semiconductor processing system;

determining a pump speed control signal in response to the sensor input; and transmitting the pump speed control signal to the variable speed vacuum pump.

33. The computer readable medium of claim 32, wherein an algorithm determines the pump speed.

34. The computer readable medium of claim 32, wherein the first control signal controls the operation of a vent valve coupled to a vacuum chamber.

35. The computer readable medium of claim 32, wherein the first control signal controls the operation of a pump valve disposed between a vacuum chamber and the variable speed vacuum pump.

* * * * *

UNITED STATES PATENT AND TRADEMARK OFFICE
CERTIFICATE OF CORRECTION

PATENT NO.     : 6,966,967 B2
DATED          : November 22, 2005
INVENTOR(S)    : Mark William Curry, Daniel Paul Greenbank and Danny Cam Toan Lu It is certified that error appears in the above-identified patent and that said Letters Patent is hereby corrected as shown below:

Column 5,
Line 62, change "Applied Material, Inc." to -- Applied Materials, Inc. --;

Column 19,
Line 17, change "at last" to -- at least --;

Column 22,
Line 4, change "al least" to -- at least --.

Signed and Sealed this

Twenty-third Day of May, 2006

JON W. DUDAS
*Director of the United States Patent and Trademark Office*